United States Patent [19]
Minoura et al.

[11] Patent Number: 5,387,953
[45] Date of Patent: Feb. 7, 1995

[54] POLARIZATION ILLUMINATION DEVICE AND PROJECTOR HAVING THE SAME

[75] Inventors: Nobuo Minoura, Yokohama; Kazumi Kimura, Atsugi, both of Japan

[73] Assignee: Canon Kabushiki Kaisha, Japan

[21] Appl. No.: 812,758

[22] Filed: Dec. 23, 1991

[30] Foreign Application Priority Data

| Dec. 27, 1990 | [JP] | Japan | 2-414988 |
| Mar. 20, 1991 | [JP] | Japan | 3-080467 |
| Dec. 20, 1991 | [JP] | Japan | 3-338580 |
| Dec. 20, 1991 | [JP] | Japan | 3-338581 |

[51] Int. Cl.$^6$ .............................. G03B 21/28
[52] U.S. Cl. ........................ 353/20; 353/34; 359/44; 359/495
[58] Field of Search .............. 353/20, 31, 30, 33, 353/34, 37, 122, 81; 359/63, 488, 487, 485, 494, 495, 496, 497, 48, 49, 40, 41

[56] References Cited

U.S. PATENT DOCUMENTS

| 3,876,285 | 4/1975 | Schwarzmueller . | |
| 4,560,999 | 12/1985 | Tokuhara | 346/160 |
| 4,798,448 | 1/1989 | Van Raalte . | |
| 4,864,390 | 9/1989 | McKechnie et al. | 358/60 |
| 4,989,076 | 1/1991 | Owada et al. | 358/61 |
| 5,124,841 | 6/1992 | Oishi | 359/487 |
| 5,153,752 | 10/1992 | Kurematsu | 353/31 |

FOREIGN PATENT DOCUMENTS

| 61-90584 | 5/1986 | Japan . |
| 61-122626 | 6/1986 | Japan . |
| 63-168626 | 6/1988 | Japan . |
| 2-93580 | 4/1990 | Japan . |

OTHER PUBLICATIONS

Patent Abstract of Japan, Japanese Patent Publication No. JP-A 2093580 (published Apr. 4, 1990).
Japanese Journal of Applied Physics, vol. 29, No. 4, Apr. 1990, Tokyo, Japan, pp. 634–637.
Patent Abstract of Japan, Japanese Patent Publication No. JP-A 61090584 (published May 8, 1986).

*Primary Examiner*—William A. Cuchlinski, Jr.
*Assistant Examiner*—William C. Dowling
*Attorney, Agent, or Firm*—Morgan & Finnegan

[57] ABSTRACT

A polarization illumination device and projector having the polarization illumination device are provided. An example of the polarization illumination device comprises an illuminator and a polarized including a polarization splitting surface and a reflecting surface, the splitting surface and the reflecting surface form an inverted V shape. The splitting surface splits part of the light into a transmitted component and a reflected component and directs the former in a first direction and the latter toward the reflecting surface. The reflecting surface reflects a remaining part of the light and directs it toward the splitting surface. The splitting surface splits the remaining part of the light into a transmitted component and a reflected component. The former directed toward a second direction different from the first direction, and the latter is returned to the illuminator. The illuminator modulates a plane of each returned reflected light component and causes each returned reflected component to be incident on the polarizer again.

16 Claims, 14 Drawing Sheets

(PRIOR ART)

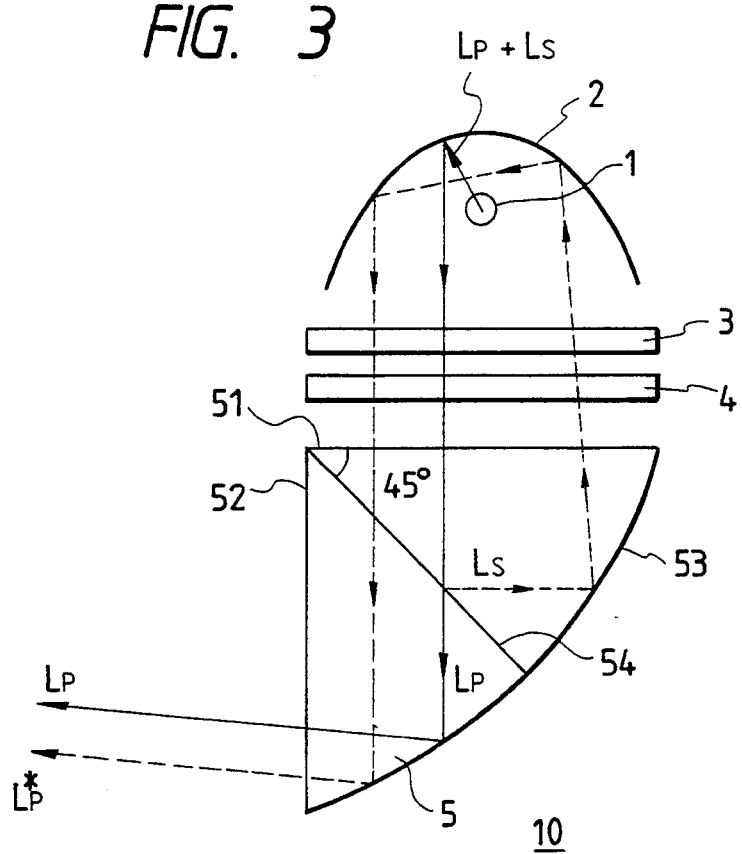
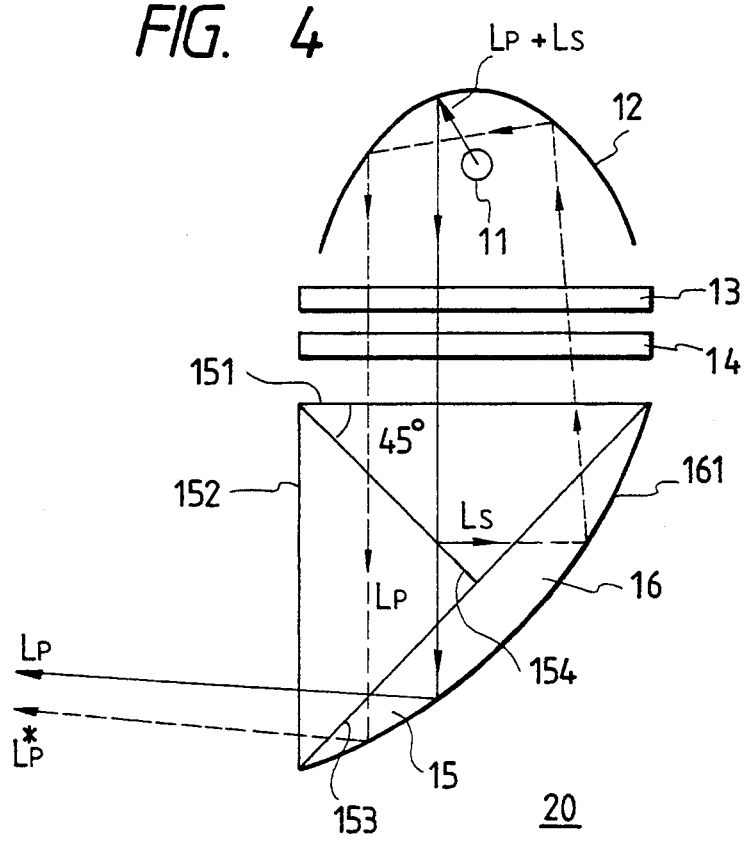

150

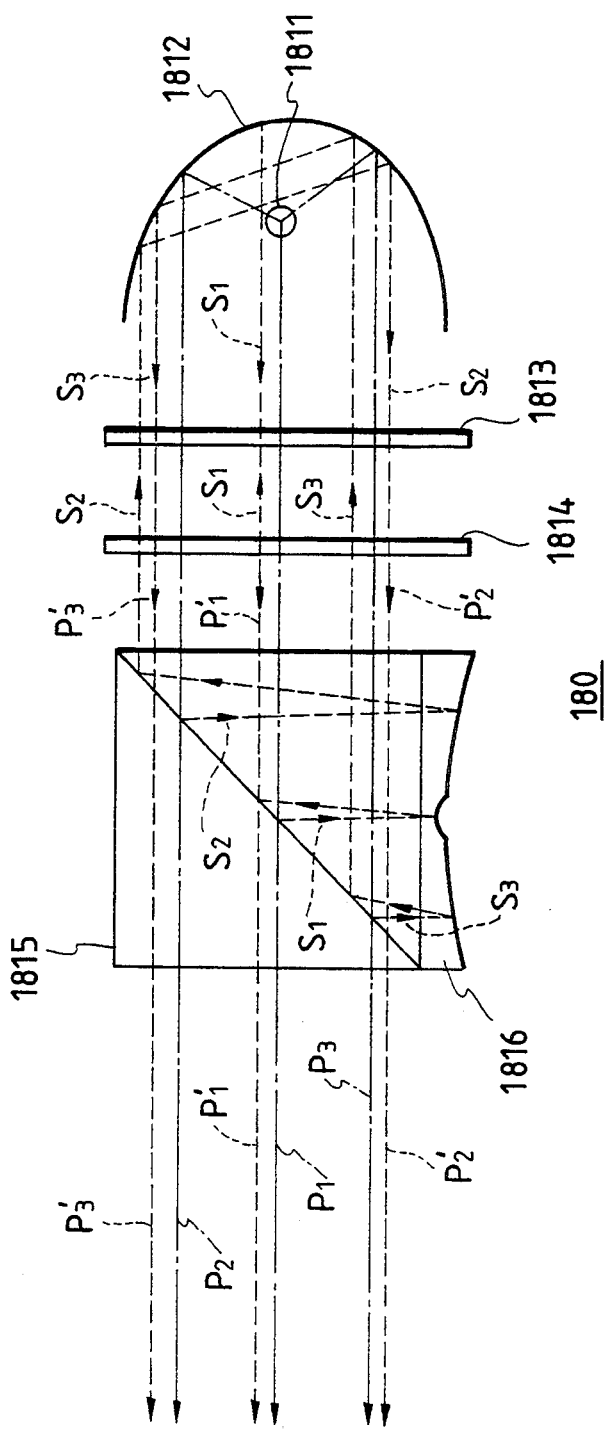
FIG. 18A
FIG. 18B

POLARIZATION ILLUMINATION DEVICE AND PROJECTOR HAVING THE SAME

BACKGROUND OF THE INVENTION

1. Field of the Invention

The present invention relates to a polarization illumination device and a projector having the same.

2. Related Background Art

FIG. 1 is a view showing the main part of a conventional projection display apparatus having a polarization illumination device.

This projection display apparatus comprises an illuminating means consisting of a light source 101 for emitting random light Ao having a large number of polarized components and a reflecting mirror 102 disposed behind the light source 101, a λ/4 optical phase plate 103 arranged on an optical path of the random light Ao emitted from the illuminating means and having an optical axis set in a desired direction, a polarization beam splitter 104 arranged opposite to the illuminating means through the λ/4 optical phase plate 103, and a liquid crystal light bulb 105 arranged opposite to the λ/4 optical phase plate 103 through the polarization beam splitter 104. In this arrangement, the polarization beam splitter 104 has first and second polarization splitting films 1041 and 1042 whose ends are in contact with each other at a right angle at the central portion of the surface facing the liquid crystal light bulb 105.

The random light Ao emitted from the light source 101 and almost collimated by the reflecting mirror 102 passes through the λ/4 optical phase plate 103 and is incident on the polarization beam splitter 104. The random light Ao is incident on the first polarization splitting film 1041 of the polarization beam splitter 104, so that a P-polarized light component $A_{P1}$ is transmitted through the film 1041 and an S-polarized light component $A_S$ is reflected by the film 1041. In this manner, the random light Ao is split into two polarized components having different polarization directions. The S-polarized component $A_S$ reflected upward at a right angle by the first polarization splitting film 1041 is reflected to the left at a right angle by the second polarization splitting film 1042 and passes through the λ/4 optical phase plate 103, thereby obtaining a circularly polarized light component Ar. The circularly polarized light component Ar is reflected by the reflecting mirror 102 toward the light source 101. The reflected component passes through the light source 101 and reflected again by the reflecting mirror 102. This reflected component is directed toward the λ/4 optical phase plate 103. The circularly polarized light component Ar passes through the λ/4 optical phase plate 103 and is converted into a P-polarized light component $A_{P2}$. The component $A_{P2}$ is incident on and passes through the first polarization splitting film 1041. The transmitted component is incident on the liquid crystal light bulb 105.

In this projection display apparatus, the random light Ao emitted from the illuminating means is split into the P-polarized light component $A_{P1}$ and the S-polarized light component $A_S$ by the first polarization splitting film 1041. Since the S-polarized light component is converted into the P-polarized light component $A_{P1}$ at the same time, the random light Ao is converted into the polarized light components (i.e., the P-polarized light components $A_{P1}$ and $A_{P2}$) having the same polarization direction, thereby illuminating the liquid crystal light bulb 105.

The following problems, however, are posed by the conventional projection display apparatus described above.

FIG. 2 is an enlarged view of the polarization beam splitter 104 shown in FIG. 1.

The S-polarized light component $A_S$ reflected by the first polarization splitting film 1041 normally contains a P-polarized light component $A_{P0}$ in a small amount. When the S-polarized light component $A_S$ is reflected by the second polarization splitting film 1042 toward the light source 101, the small amount of P-polarized light component $A_{P0}$ contained in the S-polarized light component $A_S$ is transmitted through the second polarization splitting film 1042 and then the polarization beam splitter 104, thus resulting in optical loss.

At a connection portion 1043 between the first and second polarization splitting films 1041 and 1042, i.e., on a discontinuous surface, it is difficult to form a polarization splitting film. A multilayered film constituting each polarization splitting film becomes have a small thickness, or the number of layers is decreased. For this reason, the S-polarized light component $A_S$ is partially transmitted near the connection portion 1043, thereby degrading the polarization splitting characteristics.

The S-polarized light component $A_S$ reflected by the first polarization splitting film 1041 is incident on the light-emitting portion of the light source 101 through the second polarization splitting film 1042 and the reflecting mirror 102 and is scattered and absorbed by the light-emitting portion of the light source 101. Therefore, the intensity of the S-polarized light component $A_S$ directed toward the first polarization splitting film 1041 is reduced.

SUMMARY OF THE INVENTION

It is an object of the present invention to provide a polarization illumination device excellent in optical utilization efficiency and polarization splitting characteristics, and a projector having the polarization illumination device.

A first polarization illumination device according to the present invention includes:

illuminating means consisting of a light source for emitting indeterminate polarized light and a reflecting mirror arranged behind the light source; and polarization splitting means having a polarization splitting surface for splitting the indeterminate polarized light into two polarized light components having different polarization directions and a reflecting surface having one end in contact with one end of the polarization splitting surface at a given angle, the polarization splitting surface and the reflecting surface being inclined from an optical path of the indeterminate polarized light emitted from the illuminating means, wherein the indeterminate polarized light emitted from the illuminating means is partially received by the polarization splitting surface, a transmitted light component, as part of the indeterminate polarized light, split by the polarization splitting surface is directed toward a first direction, and a reflected light component as part of the indeterminate polarized light is returned to the illuminating means through the reflecting surface, a remaining light component of the indeterminate polarized light emitted from the illuminating means is received by the reflecting surface and reflected toward the polarization splitting surface, a transmitted component, as part of the remaining light component of the indeterminate polarized light, split by the polarization splitting surface is directed toward a second direction, and at the same time, a reflected light component as part of the remaining light component is returned toward the illuminating means, and propagation directions of the transmitted light components in the first and second directions are set almost equal to each other through the polarization splitting surface.

The illuminating means may have a $\lambda/4$ optical phase plate in front of the light source, and the polarization splitting means may be formed of a multilayered dielectric film.

The illuminating means may have a $\lambda/4$ optical phase plate in front of the light source, and the polarization splitting means may be constituted by a grid polarizer.

The polarization splitting means may comprise a cholesteric liquid crystal layer.

According to the present invention, a first projector having a polarization illumination device, image forming means for modulating polarized light from the polarization illumination device to form an image, and projecting means for projecting image light formed by the image forming means, wherein the polarization illumination device includes:

illuminating means consisting of a light source for emitting indeterminate polarized light and a reflecting mirror arranged behind the light source; and polarization splitting means having a polarization splitting surface for splitting the indeterminate polarized light into two polarized light components having different polarization directions and a reflecting surface having one end in contact with one end of the polarization splitting surface at a given angle, the polarization splitting surface and the reflecting surface being inclined from an optical path of the indeterminate polarized light emitted from the illuminating means, wherein the indeterminate polarized light emitted from the illuminating means is partially received by the polarization splitting surface, a transmitted light component, as part of the indeterminate polarized light, split by the polarization splitting surface is directed toward a first direction, and a reflected light component as part of the indeterminate polarized light is returned to the illuminating means through the reflecting surface, a remaining light component of the indeterminate polarized light emitted from the illuminating means is received by the reflecting surface and reflected toward the polarization splitting surface, a transmitted component, as part of the remaining light component of the indeterminate polarized light, split by the polarization splitting surface is directed toward a second direction, and at the same time, a reflected light component as part of the remaining light component is returned toward the illuminating means, and propagation directions of the transmitted light components in the first and second directions are set almost equal to each other through the polarization splitting surface.

A second polarization illumination device according to the present invention includes:

illuminating means consisting of a light source for emitting indeterminate polarized light and a reflecting mirror arranged behind the light source; and an array having a plurality of units, each of which has a first reflecting surface, a second reflecting surface, and a polarization splitting surface, the plurality of arrays being arranged along a predetermined direction perpendicular to an optical path of the indeterminate polarized light emitted from the illuminating means, wherein in each of the units of the array, one end of the first reflecting surface is in contact with one end of the polarization splitting surface, the second reflecting surface is located parallel to the first reflecting surface below the first reflecting surface, part of the indeterminate polarized light emitted from the illuminating means is split into a transmitted light component and a reflected light component by the polarization splitting surface, the transmitted light is directed toward the optical path of the indeterminate polarized light emitted from the illuminating means, and the reflected light component is reflected by the first reflecting surface and directed toward the illuminating means, a remaining light component of the indeterminate polarized light emitted from the illuminating means is reflected by the first reflecting surface and directed toward the polarization splitting surface, and the remaining light component of the indeterminate polarized light emitted from the illuminating means is split into a transmitted light component and a reflected light component by the polarization splitting surface, the reflected component of the remaining light component is directed toward the illuminating means, and the transmitted light component of the remaining light component is reflected toward the optical path by the second reflecting surface of an adjacent unit.

According to the present invention, a second projector having a polarization illumination device, image forming means for modulating polarized light from the polarization illumination device to form an image, and projecting means for projecting image light formed by the image forming means, wherein the polarization illumination device includes:

illuminating means consisting of a light source for emitting indeterminate polarized light and a reflecting mirror arranged behind the light source; and an array having a plurality of units, each of which has a first reflecting surface, a second reflecting surface, and a polarization splitting surface, the plurality of arrays being arranged along a predetermined direction perpendicular to an optical path of the indeterminate polarized light emitted from the illuminating means, wherein in each of the units of the array, one end of the first reflecting surface is in contact with one end of the polarization splitting surface, the second reflecting surface is located parallel to the first reflecting surface below the first reflecting surface, part of the indeterminate polarized light emitted from the illuminating means is split into a transmitted light component and a reflected light component by the polarization splitting surface, the transmitted light is directed toward the optical path of the indeterminate polarized light emitted from the illuminating means, and the reflected light component is reflected by the first reflecting surface and directed toward the illuminating means, a remaining light component of the indeterminate polarized light emitted from the illuminating means is reflected by the first reflecting surface and directed toward the polarization splitting surface, and the remaining light component of the indeterminate polarized light emitted from the illuminating means is split into a transmitted light component and a reflected light component by the polarization splitting surface, the reflected component of the remaining light component is directed toward the illuminating means, and the transmitted light component of the remaining light component is reflected toward the optical path by the second reflecting surface of an adjacent unit.

According to the present invention, a third polarization illumination device comprising illuminating means consisting of a light-emitting portion and a reflecting mirror located behind the light-emitting portion, polarization splitting means for splitting light from the illuminating means into transmitted and reflected light components having different polarization planes, and returning means for returning the reflected light component from the polarization splitting means to the illuminating means, the illuminating means being arranged such that the reflected light component from the returning means is reflected by the reflecting mirror, the polarization plane of the reflected light component is modulated to coincide with that of the transmitted light component and is incident on the polarization splitting means, and the reflected light component emerges through the polarization splitting means, wherein the returning means is arranged such that at least part of the reflected light component returning to the illuminating means does not pass through the light-emitting portion.

According to the present invention, a third projector comprising a polarization illumination device, image forming means for modulating polarized light from the polarization illumination device, and projecting means for projecting image light formed by the image forming means, the polarization illumination device including illuminating means consisting of a light-emitting portion and a reflecting mirror located behind the light-emitting portion, polarization splitting means for splitting light from the illuminating means into transmitted and reflected light components having different polarization planes, and returning means for returning the reflected light component from the polarization splitting means to the illuminating means, the illuminating means being arranged such that the reflected light component from the returning means is reflected by the reflecting mirror, the polarization plane of the reflected light component is modulated to coincide with that of the transmitted light component and is incident on the polarization splitting means, and the reflected light component emerges through the polarization splitting means, wherein the returning means is arranged such that at least part of the reflected light component returning to the illuminating means does not pass through the light-emitting portion.

BRIEF DESCRIPTION OF THE DRAWINGS

FIG. 3 is a view showing the first embodiment of a polarization illumination device according to the present invention;

FIG. 4 is a view showing the second embodiment of a polarization illumination device according to the present invention;

FIGS. 9A and 9B show the sixth embodiment of a polarization illumination device according to the present invention, in which FIG. 9A is a perspective view showing part of a polarization beam splitter, and FIG. 9B is a sectional view showing an arrangement of a unit constituting the polarization beam splitter;

FIGS. 10A and 10B show the seventh embodiment of a polarization illumination device according to the present invention, in which FIG. 10A is a perspective view showing part of a polarization beam splitter, and FIG. 10B is a perspective view showing part of a first plate member constituting the polarization beam splitter;

FIGS. 18A and 18B are schematic views showing the eleventh embodiment of a polarization illumination device according to the present invention;

DETAILED DESCRIPTION OF THE PREFERRED EMBODIMENTS

Figure 1:
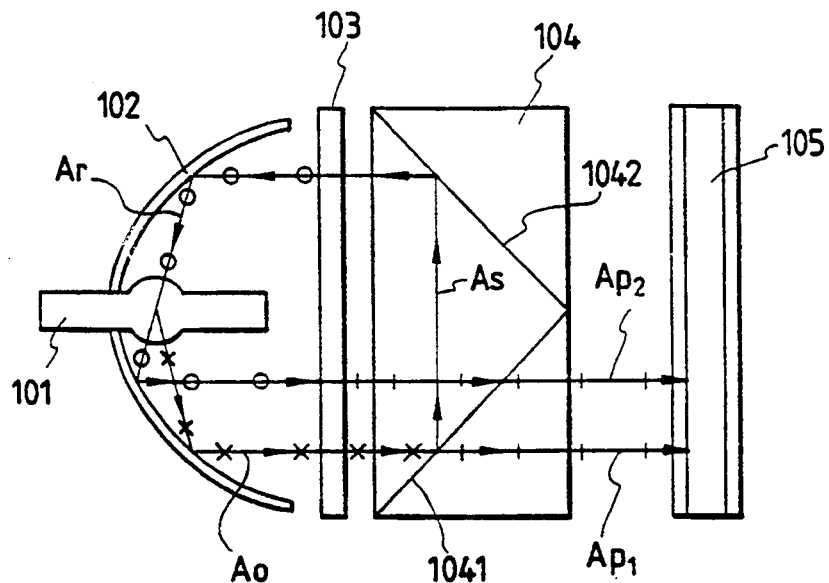
FIG. 1 is a view showing a conventional polarization illumination device.
Figure 2:
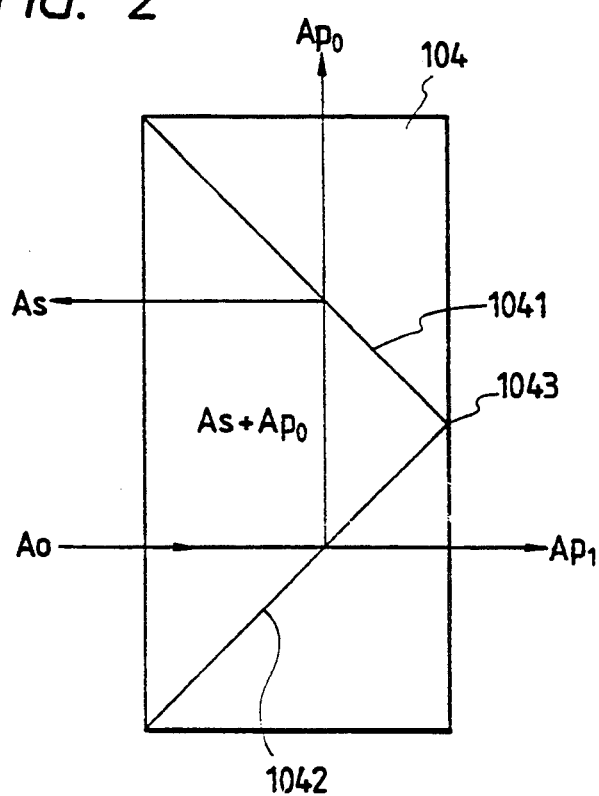
FIG. 2 is an enlarged view of a polarization beam splitter in the device shown in FIG. 1.

Preferred embodiments of the present invention will be described with reference to the accompanying drawings.

FIG. 3 is a schematic view showing the first embodiment of a polarization illumination device according to the present invention.

A polarization illumination device 10 comprises: a light source unit having a paraboloidal reflecting mirror 2 and a light source 1 including a metal halide lamp, located near a focal position of the paraboloidal reflecting mirror 2, for emitting white light $L_P+L_S$ as indeterminate polarized light having polarized components in random directions; a λ/4 optical phase plate 4 almost perpendicular to an optical path (optical axis of the device) of the almost collimated white light $L_P+L_S$ emitted from the light source unit; and a polarization beam splitter 5 having a sector-shaped section, having an incident surface 51 opposite to the λ/4 optical phase plate 4, and arranged such that one side of the incident surface 51 is in contact with one side of an exit surface 52 at a right angle.

The polarization beam splitter 5 has an operation surface 54. One side of the operation surface 54 is in contact with one side of the incident surface 51 at an angle of 45° and the other side of the operation surface 54 is in contact with an opposite surface. The operation surface 54 transmits a P-polarized light component $L_P$ of white light $L_P+L_S$ and reflects an S-polarized light component $L_S$. Note that the operation surface 54 is constituted by a deposition film having a sector-shaped section. This deposition film is formed on an inclined surface where two prisms are bonded to each other. The opposite surface of the polarization beam splitter 5 is a reflecting surface 53 having a reflecting film on an arcuated surface having a sector-shaped section. An infrared cut filter 3 is arranged opposite to the λ/4 optical phase plate 4 between the light source unit and the λ/4 optical phase plate 4.

The white light $L_P+L_S$ (indicated by a solid line in FIG. 1) emitted from the light source 1 to the paraboloidal reflecting mirror 2 is reflected and collimated by the paraboloidal reflecting mirror 2 and is incident on the infrared cut filter 3. Infrared rays except for visible light are absorbed by the infrared cut filter 3. The white light $L_P+L_S$ then passes through the λ/4 optical phase plate 4 and is incident on the polarization beam splitter 5. The P-polarized light component $L_P$ is transmitted by the operation surface 54 of the polarization beam splitter 5, and at the same time, the S-polarized light component $L_S$ is reflected to the right at a right angle, thereby obtaining the P- and S-polarized light components $L_P$ and $L_S$.

The P-polarized light component $L_P$ passing through the operation surface 54 is reflected to the left by the reflecting surface 53 of the polarization beam splitter 5 and emerges from the exit surface 52 of the polarization beam splitter 5. In this case, since the reflecting surface 53 has a concave shape, the P-polarized light component $L_P$ is focused and emerges from the exit surface 52.

The S-polarized light component $L_S$ (indicated by a broken line in FIG. 1) reflected by the operation surface 54 is reflected upward by the reflecting surface 53. Since the reflecting surface 53 is a concave surface, the S-polarized light component $L_S$ is reflected so that its optical path is slightly shifted toward the light source 1.

The S-polarized light component $L_S$ reflected by the reflecting surface 53 emerges from the incident surface 51 of the polarization beam splitter 5, passes through the λ/4 optical phase plate 4 and the infrared cut filter 3, and is incident on the paraboloidal reflecting mirror 2. The S-polarized light component $L_S$ is reflected toward the light source 1 by the paraboloidal reflecting mirror 2. However, since the optical path of the S-polarized light component $L_S$ is shifted toward the light source 1 by the reflecting surface 53, the S-polarized light component $L_S$ returns to the paraboloidal reflecting mirror 2 through an optical path not parallel to the optical path of the white light $L_P+L_S$ from the light source 1. The S-polarized light component $L_S$ does not impinge on the light source 1 but passes near the light source 1. The S-polarized light component $L_S$ is then reflected by the paraboloidal reflecting mirror 2 again and is emitted from the light source unit as almost collimated light. The S-polarized light component $L_S$ emitted from the light source unit passes through the infrared cut filter 3 and the λ/4 optical phase plate 4 and is incident on the polarization beam splitter 5 again. At this time, the S-polarized light component $L_S$ is converted into a P-polarized light component $L_{P*}$ since the S-polarized light component $L_S$ is reflected by the reflecting surface 53 and the reflecting mirror 2 and the polarization direction of a given part of the component is rotated through 90° through the λ/4 optical phase plate 4. This given part passes through the operation surface 54 and is reflected to the left by the reflecting surface 53. The reflected part emerges from the exit surface 52. At this time, since the reflecting surface 53 is a concave surface, the converted P-polarized light component $L_{P*}$ is focused by the reflecting surface 53 and emerges from the exit surface 52.

In the polarization illumination device 10, the S-polarized light component $L_S$ returned from the polarization beam splitter 5 to the paraboloidal reflecting mirror 2 does not impinge on the light source 1, thereby preventing light scattering and absorption in the light source 1. For this reason, the conversion loss in conversion of the S-polarized light component $L_S$ into the P-polarized light component $L_{P*}$ in the conventional polarization illumination device shown in FIG. 1 can be reduced, and an amount of illumination light emitted from the polarization beam splitter 5 can be increased. The volume of the polarization beam splitter 5 can be made smaller than the polarization beam splitter 104 (FIG. 1) having a cubic shape. At the same time, since the reflecting surface 53 is a concave surface, a focusing function can be provided, thereby eliminating a condenser lens and hence resulting in a compact, lightweight device.

FIG. 4 is a schematic view showing the second embodiment of a polarization illumination device according to the present invention.

A polarization illumination device 20 is substantially the same as the polarization illumination device 10 (FIG. 3) except that a polarization beam splitter 15 has a sectional shape of a right-angled triangle, one side of an operation surface 154 (i.e., a deposition film formed on an inclined surface where two rectangular prisms are bonded) is in contact with one side of an incident surface 151 at an angle of 45°, the other side of the operation surface 154 is in contact with an opposite surface 153, and a hyperbolic planar convex lens 16 having a curved reflecting surface 161 with a reflecting film is bonded to the opposite surface 153 of the polarization beam splitter 15.

In the polarization illumination device 20, white light $L_P+L_S$ (indicated by a solid line in FIG. 4) emitted from a light source 11 to a paraboloidal reflecting mirror 12 is reflected and collimated by the paraboloidal reflecting mirror 12 and is incident on an infrared cut filter 13. Infrared rays except for visible light are absorbed by the infrared cut filter 13. The white light $L_P+L_S$ passes through a λ/4 optical phase plate 14 and is incident on the polarization beam splitter 15. A P-polarized light component $L_P$ is transmitted through the operation surface 154 of the polarization beam splitter 15, and an S-polarized light component $L_S$ is reflected to the right at a right angle, thereby obtaining the P- and S-polarized light components $L_P$ and $L_S$.

The P-polarized light component $L_P$ transmitted through the operation surface 154 is reflected to the left by the reflecting surface 161 of the hyperbolic planar convex lens 16 and emerges from an exit surface 152 of the polarization beam splitter 15. In this case, since the reflecting surface 161 is a concave surface, the P-polarized light component $L_P$ is focused by the reflecting surface 161 and emerges from the exit surface 152.

On the other hand, the S-polarized light component $L_S$ (indicated by a broken line in FIG. 4) reflected by the operation surface 154 is reflected upward by the reflecting surface 161 of the hyperbolic planar convex lens 16. Since the reflecting surface 161 is a concave surface, the optical path of the S-polarized light component $L_S$ is slightly shifted toward a light source 11. The S-polarized light component $L_S$ reflected by the reflecting surface 161 emerges from an incident surface 151 of the polarization beam splitter 15 and passes through the λ/4 optical phase plate 14 and the infrared cut filter 13. This light component is incident on the paraboloidal reflecting mirror 12. The S-polarized light component $L_S$ is reflected toward the light source 11 by the paraboloidal reflecting mirror 12. However, since the optical path of the S-polarized light component $L_S$ is shifted toward the light source 11 by the reflecting surface 161 of the hyperbolic planar convex lens 16, the S-polarized light component $L_S$ returns to the paraboloidal reflecting mirror 12 through an optical path not parallel to the optical path of the white light $L_P+L_S$ from the light source 11. The S-polarized light component $L_S$ does not impinge on the light source 11 but passes near the light source 11. The S-polarized light component $L_S$ is then reflected by the paraboloidal reflecting mirror 12 again and is emitted from the light source unit as almost collimated light. The S-polarized light component $L_S$ emitted from the light source unit passes through the infrared cut filter 13 and the λ/4 optical phase plate 14 and is incident on the polarization beam splitter 15 again. At this time, the S-polarized light component $L_S$ is converted into a P-polarized light component $L_{P*}$ since the S-polarized light component $L_S$ is reflected by the reflecting surface 161 of the hyperbolic planar convex lens 16 and the reflecting mirror 12 and the polarization direction of a given part of the component is rotated through 90° through the λ/4 optical phase plate 14. This given part passes through the operation surface 154 and is reflected to the left by the reflecting surface 161 of the hyperbolic planar convex lens 16. The reflected part emerges from the exit surface 152. At this time, since the reflecting surface 161 is a concave surface, the converted P-polarized light component $L_{P*}$ is focused by the reflecting surface 161 and emerges from the exit surface 152.

In the polarization illumination device 20, the S-polarized light component $L_S$ returned from the polarization beam splitter 15 to the paraboloidal reflecting mirror 12 does not impinge on the light source 11, either, thereby preventing light scattering and absorption in the light source 11. For this reason, the conversion loss in conversion of the S-polarized light component $L_S$ into the P-polarized light component $L_{P*}$ in the conventional polarization illumination device shown in FIG. 1 can be reduced, and an amount of illumination light emitted from the polarization beam splitter 5 can be increased. Since the reflecting surface 161 of the hyperbolic planar convex lens 16 is a concave surface, the lens 16 has a focusing function, thereby eliminating a condenser lens, and hence obtaining a compact, lightweight device. Only the hyperbolic planar convex lens 16 is bonded to the opposite surface 153 of the polarization beam splitter 15 having a sectional shape of a right-angled triangle, thereby improving productivity as compared with the polarization illumination device 10 shown in FIG. 3.

Figure 5:
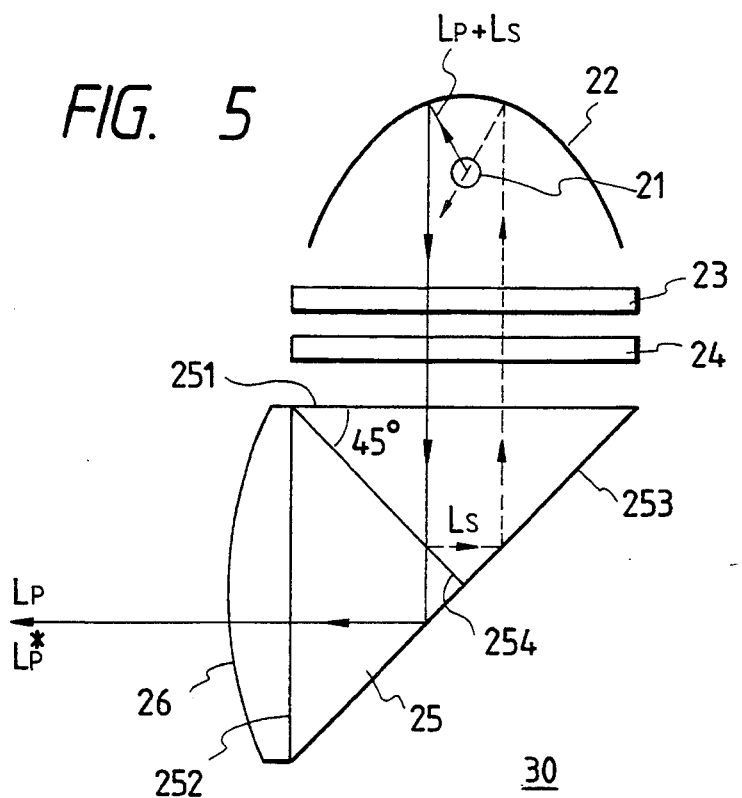
FIG. 5 is a view showing the third embodiment of a polarization illumination device according to the present invention.

FIG. 5 is a schematic view showing the third embodiment of a polarization illumination device according to the present invention.

A polarization illumination device 30 is substantially the same as the polarization illumination device 10 (FIG. 3) except that a polarization beam splitter 25 has a sectional shape of a right-angled triangle, one side of an operation surface 254 (i.e., a deposition film formed on an inclined surface where two rectangular prisms are bonded) is in contact with one side of an incident surface 251 at an angle of 45°, the other side of the operation surface 254 is in contact with an opposite surface, a reflecting film is formed on the opposite surface to constitute a reflecting surface 253, and a focusing lens 26 is arranged at an exit surface 252 of the polarization beam splitter 25.

In the polarization illumination device 30, white light $L_P+L_S$ (indicated by a solid line in FIG. 5) emitted from a light source 21 to a paraboloidal reflecting mirror 22 is reflected and collimated by the paraboloidal reflecting mirror 22 and is incident on an infrared cut filter 23. Infrared rays except for visible light are absorbed by the infrared cut filter 23. The white light $L_P+L_S$ passes through a λ/4 optical phase plate 24 and is incident on the polarization beam splitter 25. A P-polarized light component $L_P$ is transmitted through the operation surface 254 of the polarization beam splitter 25, and an S-polarized light component $L_S$ is reflected to the right at a right angle, thereby obtaining the P- and S-polarized light components $L_P$ and $L_S$.

The P-polarized light component $L_P$ transmitted through the operation surface 254 is reflected to the left at a right angle by the reflecting surface 253 formed on the opposite surface of the polarization beam splitter 25 and emerges from the exit surface 252, and is focused by the focusing lens 26.

On the other hand, the S-polarized light component $L_S$ (indicated by a broken line in FIG. 5) reflected by the operation surface 254 is reflected upward at a right angle by the reflecting surface 253. The S-polarized light component $L_S$ reflected by the reflecting surface 253 emerges from an incident surface 251 of the polarization beam splitter 25 and passes through the λ/4 optical phase plate 24 and the infrared cut filter 23. This light component is incident on the paraboloidal reflecting mirror 22. The S-polarized light component $L_S$ is reflected toward the light source 21 by the paraboloidal reflecting mirror 22. The S-polarized light component $L_S$ passes through the light source 21. The S-polarized light component $L_S$ is then reflected by the paraboloidal reflecting mirror 22 again and is emitted from the light source unit as collimated light. The S-polarized light component $L_S$ emitted from the light source unit passes through the infrared cut filter 23 and the λ/4 optical phase plate 24 and is incident on the polarization beam splitter 25 again. At this time, the S-polarized light component $L_S$ is converted into a P-polarized light component $L_{P*}$ since the S-polarized light component $L_S$ is reflected by the reflecting surface 253 and the reflecting mirror 22 and the polarization direction of a given part of the component is rotated through 90° through the λ/4 optical phase plate 24. This given part passes through the operation surface 254 and is reflected at a right angle (in the left direction) by the reflecting surface 253. The reflected part emerges from the exit surface 252 and is focused by the focusing lens 26.

Figure 6:
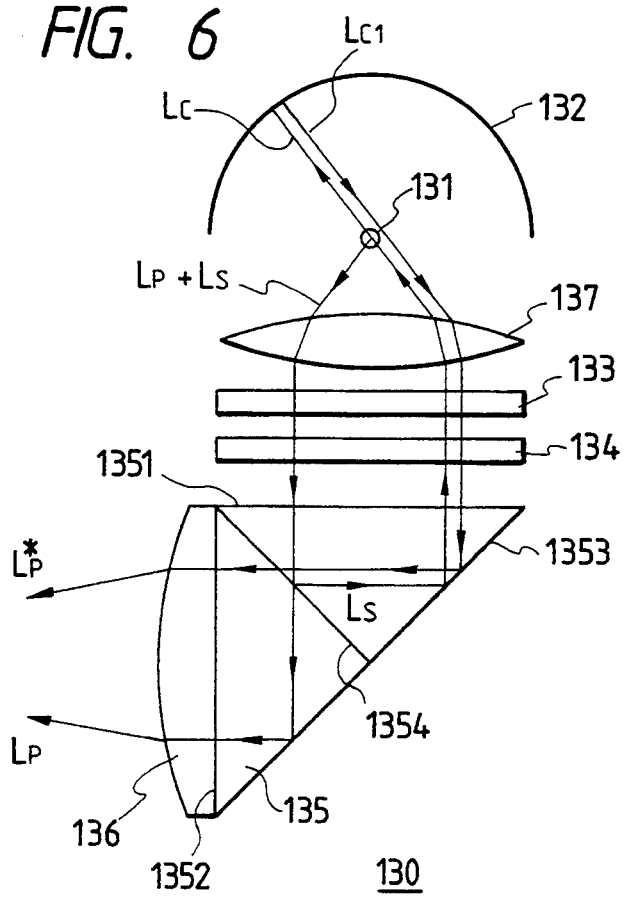
FIG. 6 is a view showing the fourth embodiment of a polarization illumination device according to the present invention.

FIG. 6 is a schematic view showing the fourth embodiment of a polarization illumination device according to the present invention.

A polarization illumination device 130 of this embodiment is substantially the same as the polarization illumination device 30 (FIG. 5) except that a spherical reflecting mirror 132 is used in place of the paraboloidal reflecting mirror 22, and a condenser lens 137 as a means for obtaining collimated light is arranged between the spherical reflecting mirror 132 and an infrared cut filter 133. A light source 131 is located at a focal position of the condenser lens 137. This focal position coincides with the position of the center of curvature of the spherical reflecting mirror 132.

In the polarization illumination device 130, white light $L_P+L_S$ emitted from the light source 131 is collimated by the condenser lens 137, passes through the infrared cut filter 133 and a λ/4 optical phase plate 134, and is incident on a polarization beam splitter 135. A P-polarized light component $L_P$ of the white light $L_P+L_S$ passes through an operation surface (polarization splitting film) 1354 and is reflected to the left at a right angle by a reflecting surface 1353. The reflected light component emerges through the focusing lens 136.

An S-polarized light component $L_S$ of the white light $L_P+L_S$ is reflected to the right at a right angle by the operation surface 1354 and is reflected upward at a right angle by the reflecting surface 1353. The S-polarized light component $L_S$ is returned toward the λ/4 optical phase plate 134. The S-polarized light component $L_S$ passes through the λ/4 optical phase plate 134 having an optical axis in a predetermined direction and is converted into a circularly polarized light component $L_C$. The component $L_C$ is directed through the condenser lens 137 toward the light source 31 located at the focal position of the condenser lens 137 as the position of the center of curvature of the spherical reflecting mirror 132. The circularly polarized light component $L_C$ incident on the light source 131 partially passes through the light source 131 while maintaining a polarized state shown in FIG. 6 and is reflected by the spherical reflecting mirror 132. At the time of reflection of the circularly polarized light component $L_C$, its rotational direction is changed to result in a circularly polarized light component $L_C$. This light component $L_{C1}$ is directed toward the light source 131. For illustrative convenience, the optical path before reflection is shifted from the optical path after reflection at the mirror 132 in FIG. 6. The circularly polarized light component $L_{C1}$ passing through the light source 131 is collimated through the condenser lens 137, passes through the infrared cut filter 133 and the λ/4 optical phase plate 134, and is incident on the polarization beam splitter 135. At this time, the circularly polarized light component $L_{C1}$ passes through the λ/4 optical phase plate 134 and is converted into a P-polarized light component $L_{P*}$. That is, since the S-polarized light component $L_S$ of the white light $L_P+L_S$ passes through the λ/4 optical phase plate 134 twice to receive the same effect as in transmission through a λ/2 optical phase plate, thereby converting the S-polarized light component $L_S$ into the P-polarized light component $L_{P*}$. The converted P-polarized light component $L_{P*}$ is reflected to the left at a right angle by the reflecting surface 1353, passes through the operation surface 1354, and emerges from the focusing lens 136.

In the polarization illumination device 10 shown in FIG. 3 and the polarization illumination device 20 shown in FIG. 4, combinations of spherical reflecting mirrors and condenser lenses as in this embodiment can be respectively used in place of the paraboloidal reflecting mirrors 2 and 12.

Figure 7:
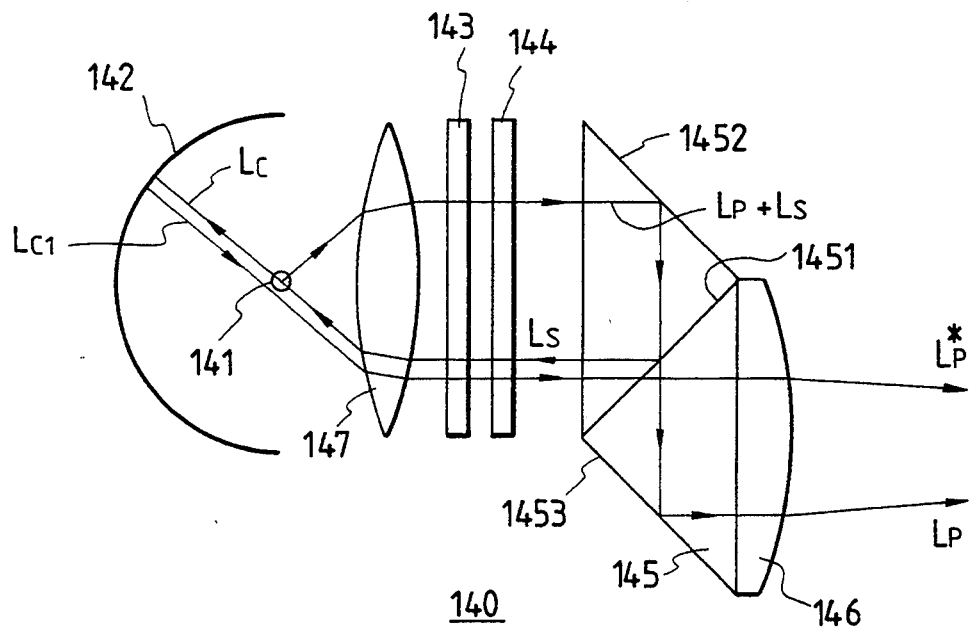
FIGS. 7 and 8 are views showing the fifth embodiment of a polarization illumination device according to the present invention.
Figure 8:
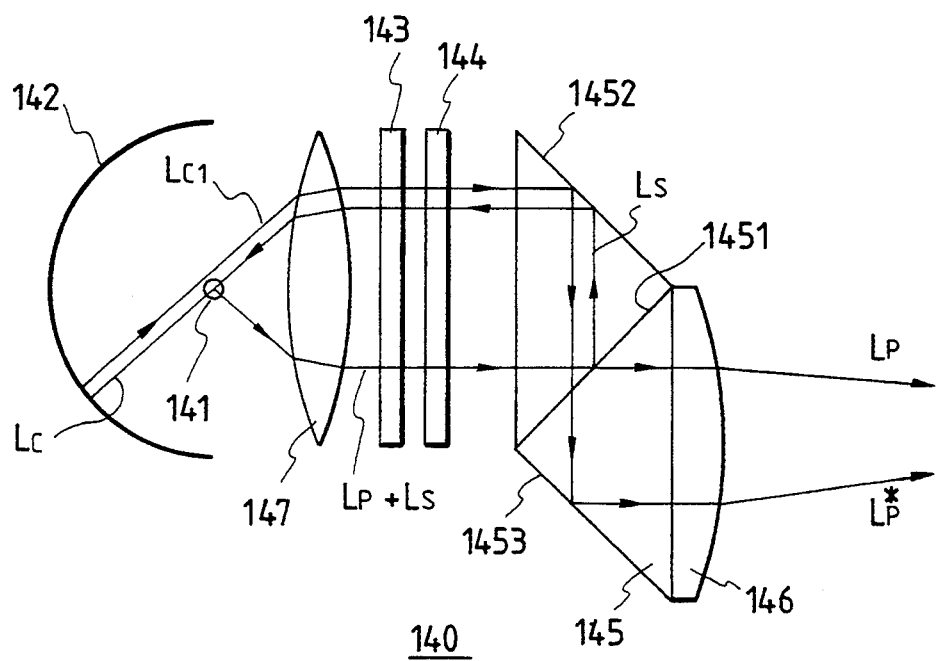

FIGS. 7 and 8 are views showing the main part of the fifth embodiment of a polarization illumination device according to the present invention.

A polarization illumination device 140 is substantially the same as the polarization illumination device 130 of FIG. 6 except that a polarization beam splitter 145 is used in place of the polarization beam splitter 135. The polarization beam splitter 145 comprises two rectangular prisms each having a sectional shape of a right-angled triangle, and an operation surface 1451 obtained by forming polarization splitting films on bonded inclined surfaces of the rectangular prisms. Nonbonded inclined surfaces of the rectangular prisms serve as a first reflecting surface 1452 and a second reflecting surface 1453. The operation surface (polarization splitting film) 1453 reflects an S-polarized light component $L_S$ of white light $L_P+L_S$ incident at an angle of 45° since the S-polarized light component $L_S$ has a polarization direction parallel to the operation surface 1453. The operation surface 1453 transmits a P-polarized light component $L_P$ having a polarization direction perpendicular to that of the S-polarized light component $L_S$.

In the polarization illumination device 140, as shown in FIG. 7, the white light $L_P+L_S$ emitted from a light source 141 is collimated by a condenser lens 147, passes through an infrared cut filter 143 and a λ/4 optical phase plate 144, and is incident on the polarization beam splitter 145. The white light $L_P+L_S$ incident on the polarization beam splitter 145 is reflected downward at a right angle by the first reflecting surface 1452 and is incident on the operation surface 1451. The P-polarized light component $L_P$ of the white light $L_P+L_S$ passes through the operation surface 1451, is reflected to the right at a right angle by the second reflecting surface 1453, and emerges through a focusing lens 146. On the other hand, the S-polarized light component $L_S$ of the white light $L_P+L_S$ is reflected to the left at a right angle by the operation surface 1451 and is directed to the λ/4 optical phase plate 144. The S-polarized light component $L_S$ is incident on the λ/4 optical phase plate 144 through the same optical path as that of the S-polarized light component $L_S$ in the polarization illumination device 130 of FIG. 6 and is converted into a P-polarized light component $L_{P*}$. The P-polarized light component $L_{P*}$ passes through the operation surface 1451 of the polarization beam splitter 145 and emerges through the focusing lens 146.

When the white light $L_P+L_S$ emitted from the light source 141 and collimated by the condenser lens 147 is to be directly incident on the operation surface 1451 of the polarization beam splitter 145, the P-polarized light component $L_P$ of the white light $L_P+L_S$ passes through the operation surface 1451 and emerges from the focusing lens 146, as shown in FIG. 8. On the other hand, the S-polarized light component $L_S$ of the white light $L_P+L_S$ is reflected upward at a right angle by the operation surface 1451, reflected at right angle by the first operation surface, and directed to the λ/4 optical phase plate 144. The S-polarized light component $L_S$ passes through the same optical path as that of the S-polarized light component $L_S$ of the polarization illumination device 130 of FIG. 4 and is then incident on the λ/4 optical phase plate 144. The S-polarized light component $L_S$ is converted into a P-polarized light component $L_{P*}$ and is reflected downward at a right angle by the first reflecting surface 1452. The reflected light component passes through the operating surface 1451 of the polarization beam splitter 145, is reflected to the right at a right angle by the second reflecting surface 1453, and emerges from the focusing lens 146.

In the polarization illumination device 140 of this embodiment, the two rectangular prisms constituting the polarization beam splitter 145 have the same shape and the same size, the number of components for manufacturing the polarization beam splitter 145 can be reduced. In addition, since most of the manufacturing cost of the polarization beam splitter 145 is charged by rectangular prisms, use of identical rectangular prisms provides an economical advantage. As is apparent from FIG. 7, central high-intensity white light $L_P+L_S$ of the white light $L_P+L_S$ emitted from the light source 141 emerges from the peripheral portion of the polarization beam splitter 145. Peripheral low-intensity white light $L_P+L_S$ of the white light $L_P+L_S$ emitted from the light source 141 emerges from the central portion of the polarization beam splitter 145. Therefore, the amount of light emerging from the peripheral portion of the polarization beam splitter 145 can be expected to be increased. This indicates that a wide image forming means in an HDTV (High-Definition TeleVision) is effectively illuminated.

In the polarization illumination device 140 of this embodiment, the two rectangular prisms are used to constitute the polarization beam splitter 145. However, rectangular prisms need not be used. For example, in the polarization illumination device 140 shown in FIG. 7, when the right angle of each prism is slightly changed, the optical path of a circularly polarized light component $L_C$ returning to the light source 141 is shifted, so that at least part of the circularly polarized light component $L_C$ detours the light source 141 and an amount of circularly polarized light component $L_C$ directly impinging on the light source 141 is small. When light impinges on the light source 141, optical loss generally occurs due to absorption in addition to transmission and scattering. An amount of optical loss cannot be neglected. If an amount of circularly polarized light component $L_C$ directly impinging on the light source 141 can be reduced, optical utilization efficiency can be improved.

Aluminum deposition may be used to form the first and second reflecting surfaces 1452 and 1453, as needed.

Figure 9A:
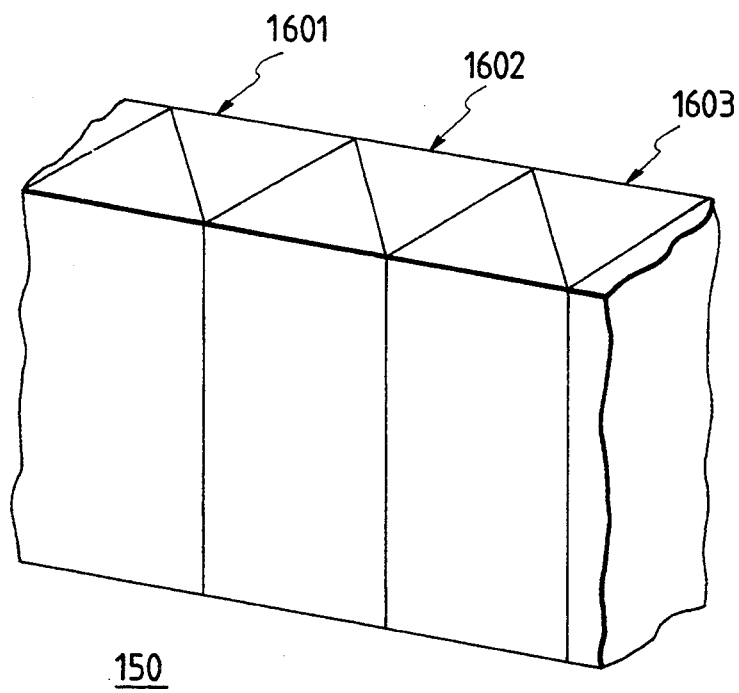
Figure 9B:
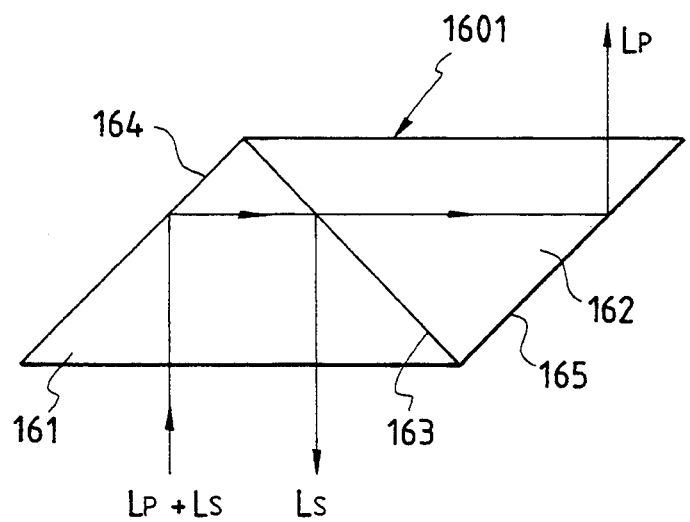

FIGS. 9A and 9B are views showing the sixth embodiment of a polarization illumination device according to the present invention, in which FIG. 9A is a perspective view showing part of a polarization beam splitter 150 of this device, and FIG. 9B is a sectional view showing a unit 1601 constituting the polarization beam splitter 150. Note that in this device, the polarization beam splitter 150 is used in place of the polarization beam splitter 145 in the device of FIG. 7.

The polarization beam splitter 150 in the polarization illumination device of this embodiment comprises the units 1601, 1602 and 1603 which are aligned to form a plate. As shown in FIG. 9B, the unit 1601 has the same arrangement as that of the polarization beam splitter 145 shown in FIG. 7. The unit 1601 comprises a first rectangular prism 161 having a large surface facing the incident side of white light $L_P+L_S$, a second rectangular prism 162 having a large area facing the exit side, an operation surface (polarization splitting film) 163 formed at a bonded portion of the first and second rectangular prisms 161 and 162, a first reflecting mirror 164 having upper and lower reflecting surfaces and formed on the inclined surface of the first rectangular prism 161 at a position opposite to the second rectangular prism 162, and a second reflecting mirror 165 having upper and lower reflecting surfaces and formed on the inclined surface of the second rectangular prism 162 at a position opposite to the first rectangular prism 161. The arrangements of other units 1602 and 1603 are the same as that of the unit 1601. Note that one of the first and second reflecting mirrors 164 and 165 need not be arranged.

Conversion of the white light $L_P+L_S$ into linearly polarized light components in the units 1601 to 1603 of the polarization beam splitter 150 is the same as that of the polarization beam splitter 145 shown in FIG. 7, and a detailed description thereof will be omitted.

In the polarization illumination device of this embodiment, the white light $L_P+L_S$ incident on the polarization beam splitter 150 is dealt as a plurality of beams. Since these beams are respectively incident on the units 1601 to 1603, the size of the polarization beam splitter 150 can be further reduced. A size reduction effect can be enhanced when the number of beams is increased.

The first and second reflecting mirrors 164 and 165 may be constituted by aluminum-deposited mirrors. Alternatively, a bonded portion of the rectangular prisms of adjacent units may be constituted as an air gap portion, thereby forming a total reflection surface.

Figure 10A:
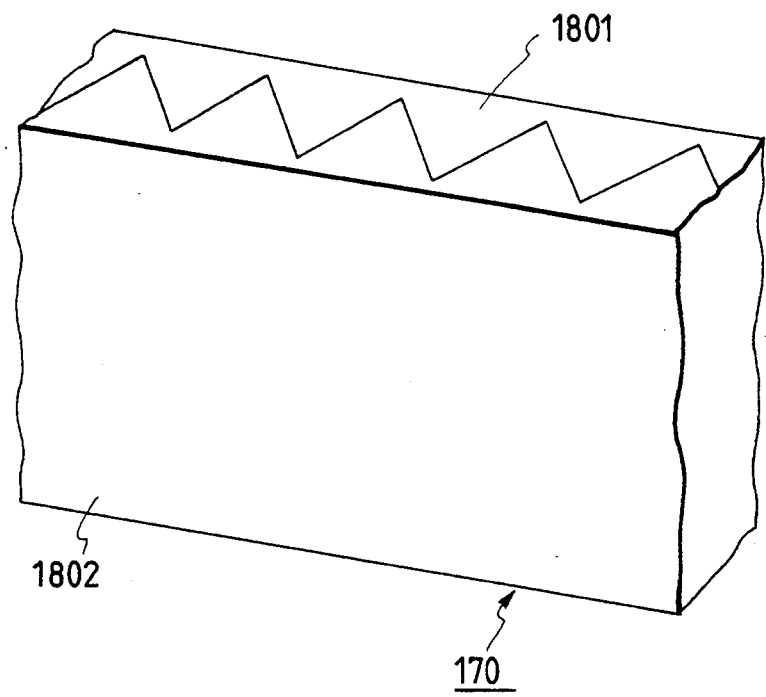
Figure 10B:
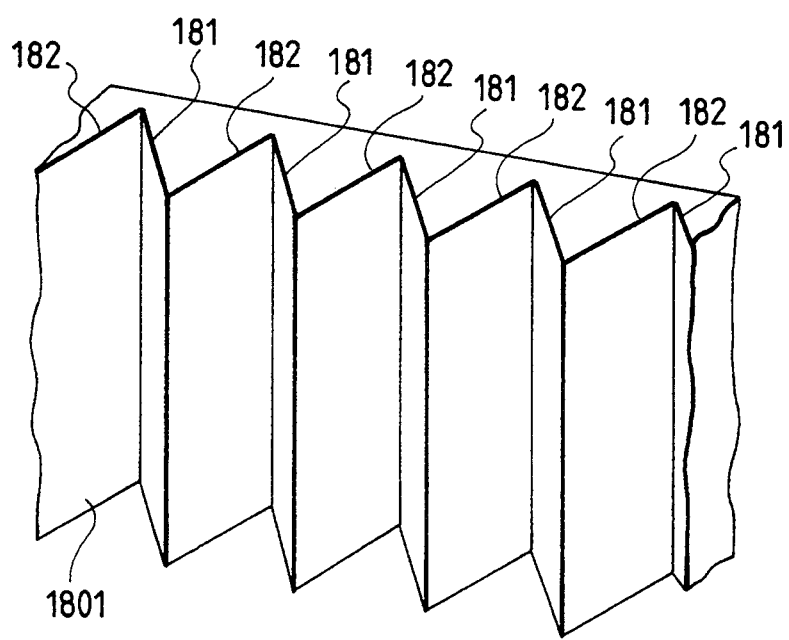

FIGS. 10A and 10B are views showing the seventh embodiment of a polarization illumination device according to the present invention, in which FIG. 10A is a perspective view showing part of a polarization beam splitter 170 of this device, and FIG. 10B is a perspective view showing part of a first plate member 1801 constituting the polarization beam splitter 170. Note that in this device, the polarization beam splitter 170 is used in place of the polarization beam splitter 145 in the device of FIG. 7.

In the polarization beam splitter 170 in the polarization illumination device of this embodiment, the first and second plate members 1801 and 1802 are bonded to each other to constitute a plate, as shown in FIG. 10A. The first plate member 1801 has saw-toothed projections each having a vertex angle of about 90°, and the inclined surfaces of each saw-toothed projection serve as an operation surface (polarization splitting film) 181 and a reflecting mirror 182, respectively, as shown in FIG. 10B. The arrangement of the second plate member 1802 is the same as that of the first plate member 1801.

Conversion of white light $L_P+L_S$ in the polarization beam splitter 170 is the same as that of the polarization beam splitter 145 shown in FIG. 7, and a detailed description thereof will be omitted.

The polarization illumination device of this embodiment is excellent in mechanism strength.

In each of the polarization illumination devices of the above embodiments, and specifically in each of the polarization illumination devices shown in FIG. 5 to 10B, the polarized light component emerges through the focusing lens. However, the focusing lens need not be used. In this case, a P-polarized light component $L_P$ and a converted P-polarized light component $L_{P*}$ emerge parallel to each other.

Figure 11:
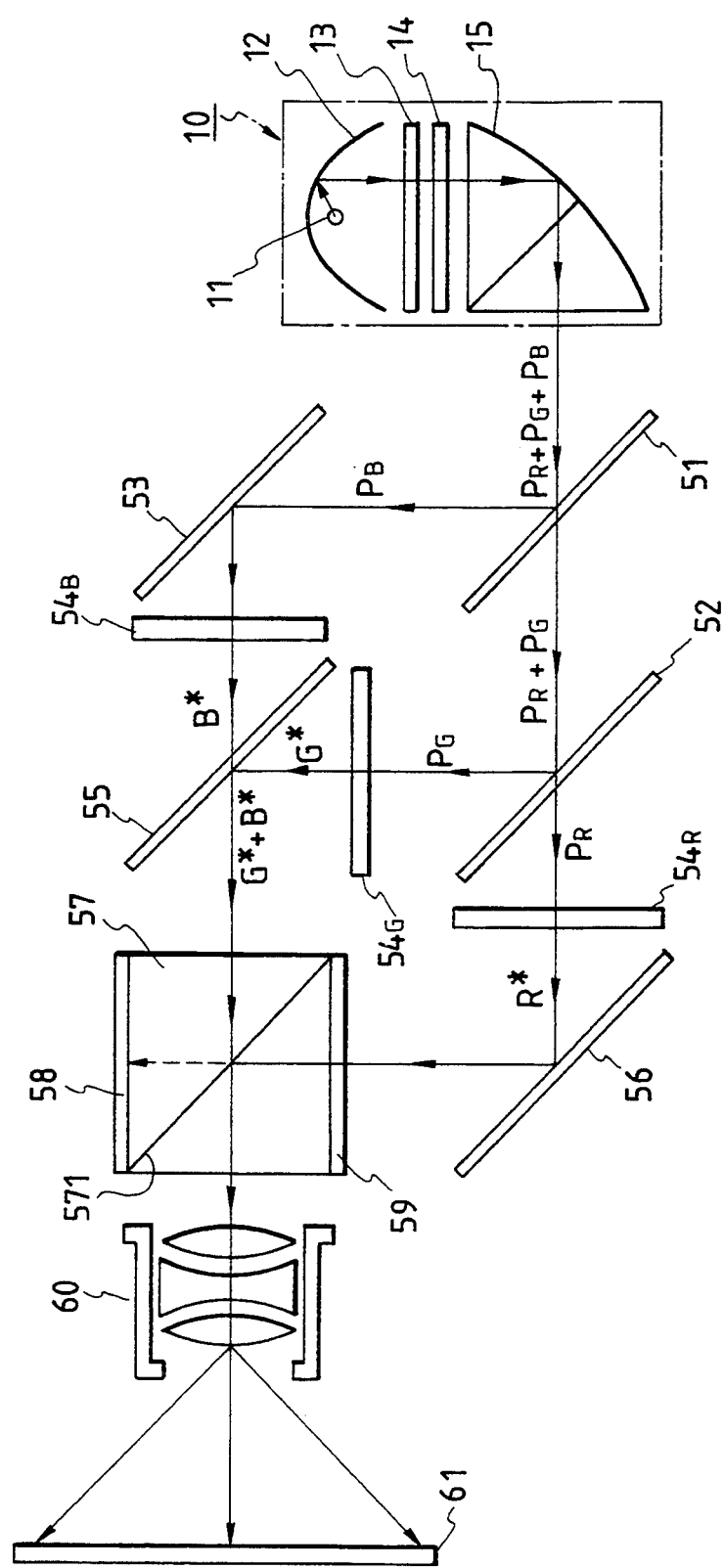
FIG. 11 is a schematic view showing the first embodiment of a projection display apparatus or projector according to the present invention.

FIG. 11 is a schematic view showing the first embodiment of a projection display apparatus.

This projection display apparatus comprises the polarization illumination device 10 shown in FIG. 3, a color separating means for separating white light emitted from the polarization illumination device 10 into red, green, and blue light components, three liquid crystal light bulbs constituted by TN liquid crystal devices for modulating the respective color components in accordance with red, green, and blue signal components of a color image signal, a color synthesizing means for synthesizing the color components modulated with the respective liquid crystal light bulbs, and a projection lens 60 for projecting composite color light synthesized by the color synthesizing means on a screen 61.

The color separating means comprises a first separation dichroic mirror 51 for transmitting a yellow light component $P_R+P_G$ of the white light $P_R+P_G+P_B$ emitted from the polarization illumination device 10 and reflecting a blue light component $P_B$ upward at a right angle, a second separation dichroic mirror 52 for transmitting a red light component PR Of the yellow light component $P_R+P_G$ and reflecting a green light component $P_G$ upward at a right angle, and a separation reflecting mirror 53 for reflecting the reflected blue light component $P_B$ to the left at a right angle.

The three liquid crystal light bulbs comprise a red liquid crystal light bulb 54R for modulating the red light component $P_R$ transmitted through the second separation dichroic mirror 52 in accordance with the red signal component of the color image signal, a green liquid crystal light bulb 54G for modulating the green light component $P_G$ reflected by the second separation dichroic mirror 52 in accordance with the green signal component of the color image signal, and a blue liquid crystal light bulb 54B for modulating the blue light component $P_B$ reflected by the separation reflecting mirror 53 in accordance with the blue signal component of the color image signal.

The color synthesizing means comprises a synthesizing dichroic mirror 55 for reflecting a green light component G* modulated by the green liquid crystal light bulb 54G to the left at a right angle and transmitting a blue light component B* modulated by the blue liquid crystal light bulb 54B to synthesize the modulated green light component G* with the modulated blue light component B*, thereby obtaining a modulated cyan light component G*+B*, a synthesizing reflecting mirror 56 for reflecting a red light component R* modulated by the red liquid crystal light bulb 54R upward at a right angle, and a synthesizing polarization beam splitter 57 having an operation surface 571 for transmitting an S-polarized light component of the modulated light component R*, which is incident through a λ/2 optical phase plate 59, and reflecting a P-polarized light component of the modulated red light component R* to the left at a right angle, and for transmitting a P-polarized light component of the modulated cyan light component G*+B* and reflecting an S-polarized light component of the modulated cyan light component G*+B* to the left at a right angle. A light-absorbing plate 58 is bonded to the surface of the synthesizing polarization beam splitter 57 at a position opposite to the λ/2 optical phase plate 59. The light-absorbing plate 58 absorbs the S-polarized light component (indicated by a broken line) of the modulated red light component R* transmitted through the operation surface 571, and the S-polarized light component of the modulated cyan light component G*+B* reflected by the operation surface 571.

An operation of this projection display apparatus will be described below.

White light as indeterminate polarized light emitted from a light source 11 is converted into a linearly polarized light (i.e., the white light $P_R+P_G+P_B$ consisting of the P-polarized light component) through a λ/4 optical phase plate 14 and a polarization beam splitter 15. The linearly polarized light is output from the polarization illumination device 10.

The white light $P_R+P_G+P_B$ emitted from the polarization illumination device 10 is separated into the yellow light component $P_R+P_G$ and the blue light component $P_B$ by the first separation dichroic mirror 51. The yellow light component $P_R+P_G$ is further separated into the red light component $P_R$ and the green light component $P_G$ by the second separation dichroic mirror 52, thereby color-separating the white light $P_R+P_G+P_B$ into the red, green, and blue light components.

The polarization direction of the red color component $P_R$ is rotated by the red liquid crystal light bulb 54R in accordance with the red signal component of the color image signal, thereby modulating the red light component $P_R$ into the red light component R* containing both P- and S-polarized light components. Similarly, the green light component $P_G$ is modulated by the green liquid crystal light bulb 54G into the green light component G* containing both the P- and S-polarized light components in accordance with the green signal component of the color image signal. The blue light component $P_B$ is reflected by the separation reflecting mirror 53 and is modulated by the blue liquid crystal light bulb 54B into the green light component B* containing both the P- and S-polarized light components in accordance with the blue signal component of the color image signal.

The modulated red light component R* is reflected by the synthesizing reflecting mirror 56 and passes through the λ/2 optical phase plate 59, so that the polarization direction of the light component R* is rotated through 90°. The modulated red light component R* is incident on the synthesizing polarization beam splitter 57. At this time, the polarization direction of the P-polarized light component of the modulated red light component R* is rotated through 90° by the λ/2 optical phase plate 59, so that the P-polarized light component is converted into an S-polarized light component for the operation surface 571 of the synthesizing polarization beam splitter 57. The resultant light component is reflected to the left at a right angle by the operation surface 571. On the other hand, the polarization direction of the S-polarized light component of the modulated red light component R* is rotated through 90° by the λ/2 optical phase plate 59, so that the S-polarized light component serves as a P-polarized light component for the operation surface 571. For this reason, the resultant light component is transmitted through the operation surface 571, is incident on the light-absorbing plate 58, and is absorbed by the light-absorbing plate 58.

The modulated green light component G* and the modulated blue light component B* are synthesized by the synthesizing dichroic mirror 55 and are converted into the modulated cyan light component G*+B*. The cyan light component G*+B* is incident on the synthesizing polarization beam splitter 57. At this time, the P-polarized light component of the modulated green light component G* and the P-polarized light component of the modulated blue light component B* are transmitted through the operation surface 571. However, the S-polarized light component of the modulated green light component G* and the S-polarized light component of the modulated blue light component B* are reflected by the operation surface 571 and are absorbed by the light-absorbing plate 58.

The P-polarized light component of the modulated red light component R* is reflected by the operation surface 571, and the P-polarized light component of the modulated green light component G* and the P-polarized light component of the modulated blue light component B* are transmitted through the operation surface 571, thereby synthesizing the three P-polarized light components. Therefore, white light modulated in accordance with the color image signal emerges from the synthesizing polarization beam splitter 57.

The modulated white light is projected on the screen 61 by the projection lens 60, and a color image is enlarged and displayed on the screen 61.

In this projection display apparatus, since the three liquid crystal light bulbs $54_R$, $54_G$, and $54_B$ are illuminated with the polarization illumination device 10 as the polarization illumination device 10 of FIG. 3, the brightness of the color image enlarged and projected on the screen 61 can be improved. At the same time, since the polarization illumination device 10 can be made compact and light in weight, thereby obtaining a compact, lightweight projection display apparatus.

Figure 12:
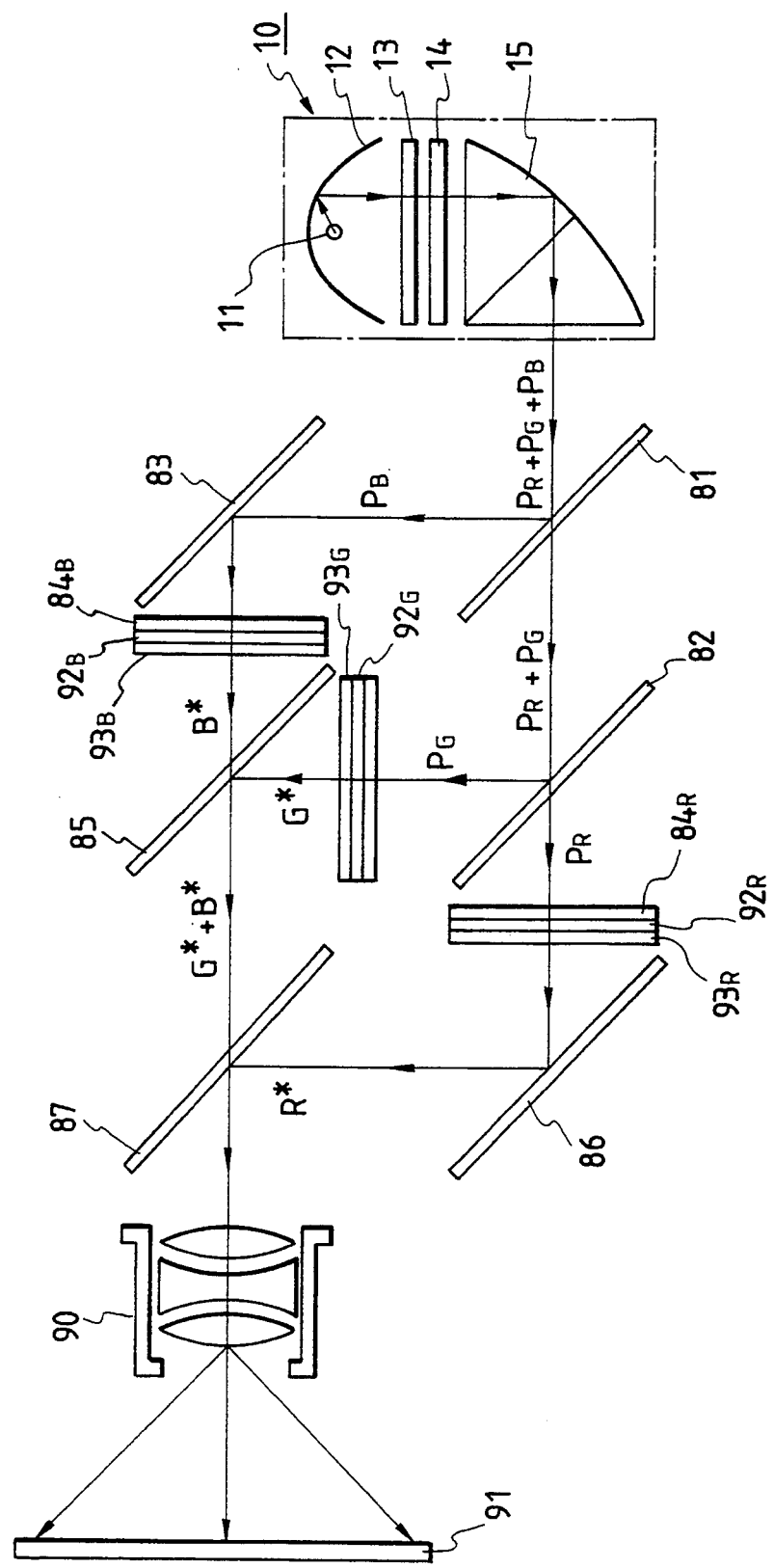
FIG. 12 is a schematic view showing the second embodiment of a projection display apparatus according to the present invention.

FIG. 12 is a schematic view showing the second embodiment of a projection display apparatus according to the present invention.

This projection display apparatus is substantially the same as that shown in FIG. 11 except that liquid crystal panels each having an exit surface supported by a transparent support plate through a deflection plate are used as liquid crystal light bulbs, a modulated red light component R* and a modulated cyan light component G*+B* are synthesized by a second synthesizing dichroic mirror 87.

In this projection display apparatus, white light as indeterminate polarized light emitted from a light source 11 is converted into linearly polarized light (i.e., the white light $P_R+P_G+P_B$ consisting of the P-polarized light component) through a λ/4 optical phase plate 14 and a polarization beam splitter 15. The linearly polarized light is output from a polarization illumination device 10.

The white light $P_R+P_G+P_B$ is separated into a yellow light component $P_R+P_G$ and a blue light component $P_B$ by a first separation dichroic mirror 81. The yellow light component $P_R+P_G$ is further separated into a red light component $P_R$ and a green light component $P_G$ by a second separation dichroic mirror 82, thereby color-separating the white light $P_R+P_G+P_B$ into the red, green, and blue light components.

The polarization direction of the red color component $P_R$ is rotated by a red liquid crystal panel $84_R$, and its S-polarized light component is absorbed by a polarization film $92_R$, so that the red color component $P_R$ is converted into the modulated red light component R* containing only the P-polarized light component. The red light component R* emerges through a transparent support plate $93_R$. Similarly, the green light component $P_G$ is modulated by a green liquid crystal panel $84_G$ in accordance with the green signal component of the color image signal, and its S-polarized light component is absorbed by a polarization film $92_G$, so that the green light component $P_G$ is converted into a green light component G* containing only the P-polarized light component. The blue light component $P_B$ is reflected by a separation reflecting mirror 83 and modulated by a blue liquid crystal panel $84_B$ in accordance with the blue signal component of the color image signal and its S-polarized light component is absorbed by a polarization film $92_B$, so that the blue light component $P_B$ is converted into a blue light component B* containing only the P-polarized light component.

The modulated red light component R* is reflected upward at a right angle by a synthesizing reflecting mirror 86 and is incident on the second synthesizing dichroic mirror 87. The modulated green light component G* and the modulated blue light component B* are synthesized by a first synthesizing dichroic mirror 85 and is thus converted into the modulated cyan light component G*+B*. The modulated cyan light component G*+B* is incident on the synthesizing dichroic mirror 87.

The modulated red light component R* is reflected to the left at a right angle by the second synthesizing dichroic mirror 87 and the modulated cyan light component G*+B* is transmitted therethrough, so that these two modulated light components are synthesized. As a result, white light modulated in accordance with the color image signal emerges from the second synthesizing dichroic mirror 87.

The modulated white light is projected on a screen 91 by a projection lens 90, and a color image is enlarged and displayed on the screen 91.

In this projection display apparatus, since the three light bulbs constituted by the liquid crystal panels $84_R$, $84_G$, and $84_B$ are illuminated with the polarization illumination device 10 as the polarization illumination device 10 of FIG. 3, the brightness of the color image enlarged and projected on the screen 91 can be improved. At the same time, since the polarization illumination device 10 can be made compact and light in weight, thereby obtaining a compact, lightweight projection display apparatus as in the projection display apparatus shown in FIG. 11.

Figure 13:
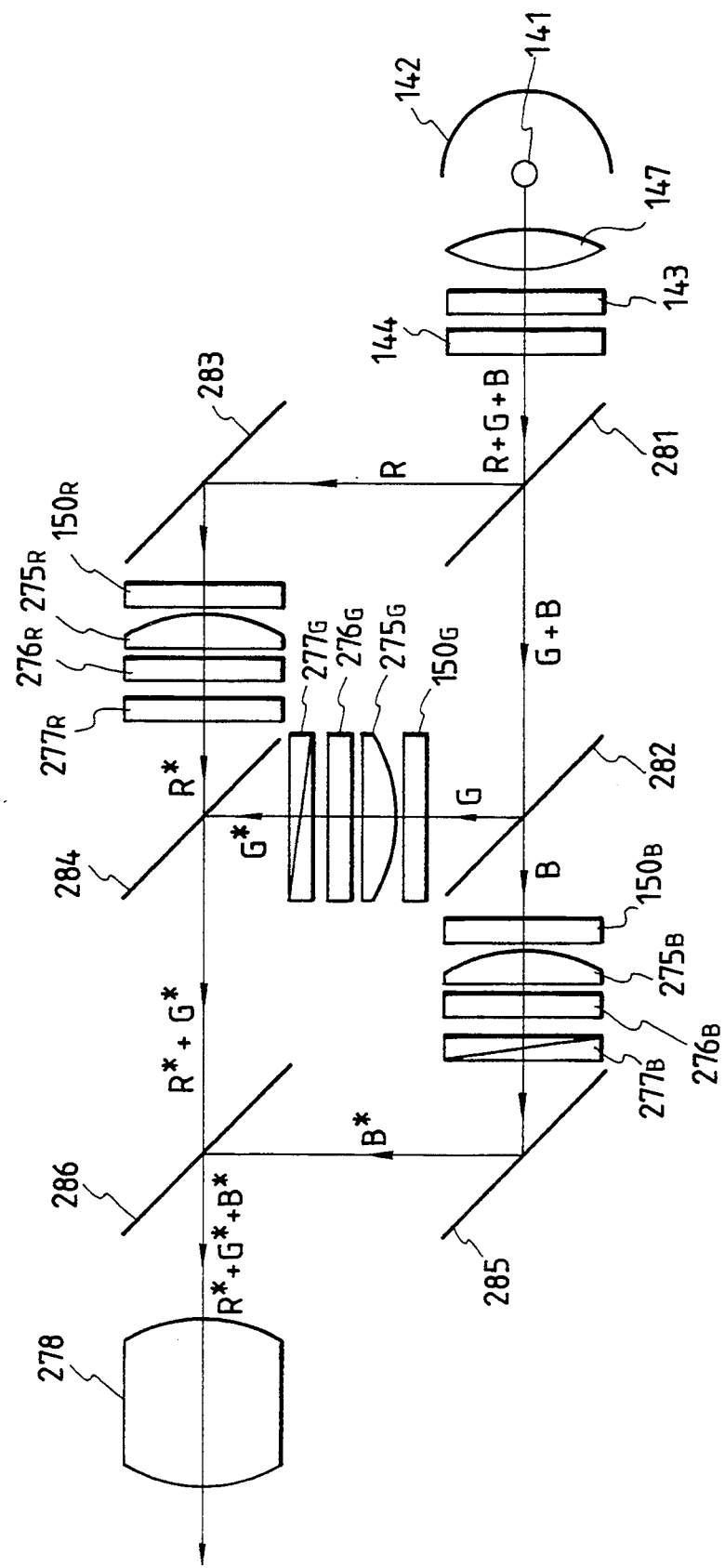
FIG. 13 is a schematic view showing the third embodiment of a projection display apparatus according to the present invention.

FIG. 13 is a schematic view showing the third embodiment of a projection display apparatus according to the present invention.

This projection display apparatus comprises a polarization illumination device as in the polarization illumination device described with reference to FIGS. 9A and 9B. A red flat polarization beam splitter $150_R$, a green flat polarization beam splitter $150_G$, and a blue flat polarization beam splitter $150_B$, each having the same arrangement as the polarization beam splitter 150 shown in FIGS. 9A and 9B, are arranged between separation reflecting mirror 283 and a red condenser lens $275_R$, between a second separation dichroic mirror 282 and a green condenser lens 275G, and between a second separation dichroic mirror 282 and a blue condenser lens $275_B$, respectively.

A red light component R of white light R+G+B emitted from a light source 141 and collimated by a condenser lens 147 is reflected upward at a right angle by a first separation dichroic mirror 281 and a cyan light component G+B of the white light R+G+B is transmitted through a first separation dichroic mirror 281. A green light component G of the white light R+G+B is reflected upward at a right angle by the second dichroic mirror 282, and a blue light component B is transmitted therethrough, thereby color-separating the white light R+G+B into the red light component R, the green light component G, and the blue light component B. The red light component R is reflected to the left at a right angle by a separation reflecting mirror 283 and is incident on a red flat polarization beam splitter $150_R$. At this time, a P-polarized light component $R_P$ of the red light component R passes through the red flat polarization beam splitter $150_R$ and is incident on a red liquid crystal light bulb $276_R$ through the red condenser lens $275_R$. An S-polarized light component $R_S$ of the red light component R is reflected by the red flat polarization beam splitter $150_R$ and is returned to the light source 141 through the separation reflecting mirror 283, the first separation dichroic mirror 281, a λ/4 optical phase plate 144, an infrared cut filter 143, and the condenser lens 147. The S-polarized light component $R_S$ is reflected by a spherical reflecting mirror 142 and is incident on the red light polarization beam splitter $150_R$ again through a return optical path. At this time, the S-polarized light component $R_S$ of the red light component R passes through the λ/4 optical phase plate 144 twice and is converted into a P-polarized light component $R_{P*}$ of the red light component R. The P-polarized light component $R_{P*}$ passes through the red flat polarization beam splitter $150_R$ and is incident on the red liquid crystal light bulb $276_R$ through the red condenser lens $275_R$. The green and blue light components G and B are also incident on green and blue liquid crystal light bulbs $276_G$ and $276_B$, respectively.

Red and green light components R* and G* respectively modulated by the red and green liquid crystal light bulbs $276_R$ and $276_G$ are synthesized by a first synthesizing dichroic mirror 284 and converted into a modulated cyan light component G*+B*. The modulated cyan light component G*+B* and the blue light component B* modulated by the blue liquid crystal light bulb $276_B$ are synthesized by a second synthesizing dichroic mirror 286, thereby obtaining modulated white light R*+G*+B*. The modulated white light R*+G*+B* is projected and displayed on a screen (not shown) by a projection lens 278.

This projection display apparatus has the following effects.

It is generally difficult to suppress wavelength dependency of the polarization splitting film to zero. An efficiency limit is present for incident white light. As in this embodiment, polarization beam splitters are arranged in units of colors to provide excellent design for increasing the efficiency and improving color reproducibility.

When the flat polarization beam splitters are used in this embodiment, as opposed to the conventional arrangement shown in FIG. 1, the resultant apparatus can be made compact even in a tri-color arrangement.

It is very effective to arrange the polarization beam splitters near the liquid crystal light bulbs (LCDs) in view of optical utilization. Compactness of the polarization beam splitter of this embodiment can be maximally utilized. More specifically, a beam from a light source having a light-emitting portion having a limited size cannot be perfectly collimated and has a finite spread angle. The spread angle is increased in proportion to a compression ratio of the diameter of a beam compressed by a certain optical system from the beam having the finite spread angle. For example, in the conventional arrangement shown in FIG. 1, since a prism having a large size is used in the polarization beam splitter, the resultant apparatus cannot be made compact. In order to prevent this, when the diameter of a beam emerging from the spherical reflecting mirror is to be decreased to cause a beam having a small diameter to be incident on the polarization beam splitter, the spread angle of the beam is undesirably increased. In this case, the focusing efficiency of the liquid crystal light bulb (LCD) is largely degraded due to an increase in spread angle. To the contrary, in this embodiment, since the flat polarization beam splitters are used, the polarization beam splitter can be arranged near the liquid crystal light bulb (LCD), thereby obtaining a compact arrangement and preventing degradation of focusing efficiency.

The projection display apparatus according to the present invention is not limited to that exemplified in this embodiment but can be replaced with an apparatus using a cross dichroic mirror in a color separation system, an apparatus using a cross dichroic mirror in a color synthesizing system, an apparatus using three color projection lenses in place of the color synthesizing system, or the like. In addition, the polarization beam splitters need not be located after the white light is separated into three color components, but can be located in or before the color separation system. The number of necessary polarization beam splitters can vary depending on applications. Moreover, reflection liquid crystal light bulbs can be used. In either case, when a plurality of polarization beam splitters are used, they must be located at optically equivalent positions so as to suppress color irregularity. The optically equivalent positions indicate the same position in the optical path and similar beam distributions (propagation directions and amplitudes of the light components).

In each embodiment described above, the paraboloidal reflecting mirror 2 shown in FIG. 3 or the spherical reflecting mirror 132 shown in FIG. 6 is used as a reflecting mirror located behind the light source of the polarization illumination device. However, an elliptical reflecting mirror may be used as this reflecting mirror.

Figure 14:
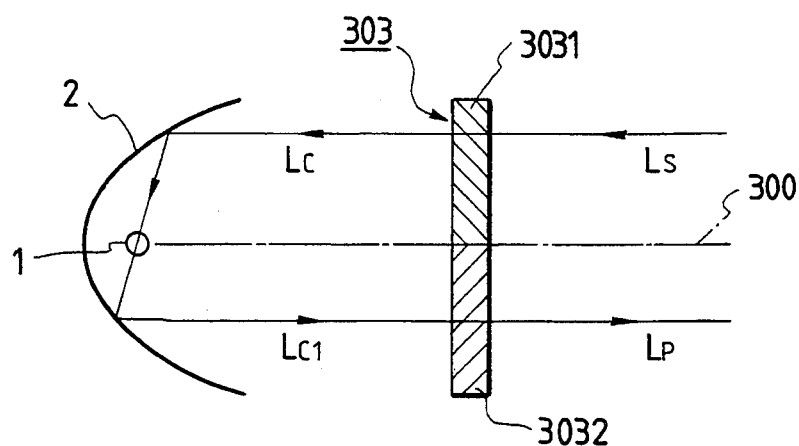
FIG. 14 is a view showing another arrangement of a λ/4 optical phase plate.

Although the paraboloidal reflecting mirror generally has higher optical utilization efficiency than that of the spherical reflecting mirror for obtaining a collimated beam, the spherical reflecting mirror can be advantageously utilized to improve polarization conversion efficiency because the number of times of reflection at the reflecting mirror is an odd number. An illumination system for improving polarization conversion efficiency using a paraboloidal reflecting mirror is exemplified in FIG. 14. In the illumination system shown in FIG. 14, a paraboloidal reflecting mirror 2 is arranged behind a light source 1, and a λ/4 optical phase plate 303 consisting of a first λ/4 optical phase plate 3031 and a second λ/4 optical phase plate 3032 which are bonded using an optical axis 300 as their bonding boundary is used. The optical axes of the first and second λ/4 optical phase plates 3031 and 3032 are set such that a large amount of P-polarized light component $L_P$ is obtained from an S-polarized light component $L_S$ from a polarization beam splitter. The optical axis of the first λ/4 optical phase plate 3031 is normally set to be shifted by about 90° from the optical axis of the second λ/4 optical phase plate 3032, thereby maximizing polarization conversion efficiency. The illumination system shown in FIG. 14 can be applied to each polarization illumination device disclosed in the present application.

The prisms used in the polarization beam splitter frequently consist of optical glass having a large selection of refractive indices so as to optimize the splitting function of the polarization splitting film, but can consist of a plastic material. Alternatively, parallel plates may be used in place of the prisms.

Although the polarization splitting film may be generally constituted by an optical multilayered film, the polarization splitting film may be obtained using a grid polarizer in place of the optical multilayered film, thereby obtaining the same effect as described above. In this case, an enhanced effect, i.e., a lightweight polarization illumination device can be expected. The grid polarizer has a micro-grid structure in which metal members are arranged parallel to each other. When light having a wavelength twice the grid pitch is to be incident, a polarized light component parallel to the grid is reflected, and a polarized light component perpendicular to the grid is transmitted.

A cholesteric liquid crystal can be used in place of the optical multilayered film. The cholesteric liquid crystal has a function of separating indeterminate polarized light into a pair of circularly polarized light components rotated clockwise and counterclockwise and reflects one circularly polarized light component and transmits the other circularly polarized light component. When light is to be reflected by a reflecting mirror located behind the light source, the clockwise circularly polarized light component becomes a counterclockwise circularly polarized light component, and vice versa. A λ/4 optical phase plate need not be arranged in front of the light source unlike in each embodiment described above. That is, the linearly polarized light need not be converted into circularly polarized light. In this case, a beam emitted from the polarization illumination device of this embodiment is circularly polarized light. When a liquid crystal light bulb for modulating the linearly polarized light to form image light is used, a λ/4 optical phase plate is placed in the optical path of the exit light to convert the circularly polarized light into linearly polarized light.

The λ/4 optical phase plate may be formed by a crystalline material such as mica or quartz, a rolled polymer film, a low molecular liquid crystal having a predetermined thickness and having molecular axes aligned in a predetermined direction, or a side chain type polymer liquid crystal, or a low molecular liquid crystal dispersed in a polymer.

The polarization illumination devices and the projection display apparatuses according to the present invention are not limited to those in the above embodiments.

Figure 15:
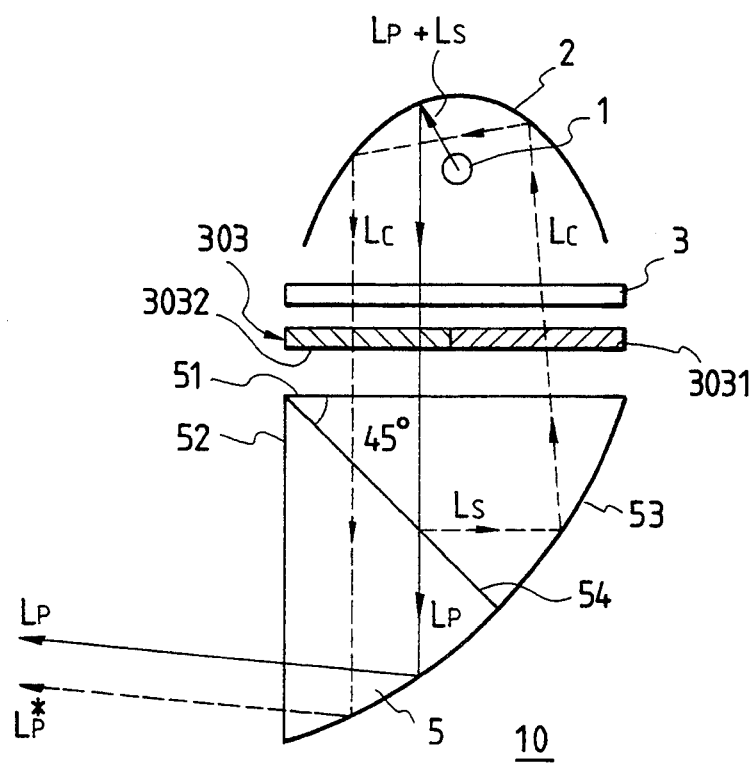
FIG. 15 is a view showing the eighth embodiment as a modification of the first embodiment of the polarization illumination device of the present invention.

FIG. 15 is a schematic view showing the eighth embodiment of a polarization illumination device according to the present invention. The eighth embodiment is obtained by applying the illumination system of FIG. 14 to the first embodiment of FIG. 3. In the eighth embodiment, a λ/4 optical phase plate 303 having a pair of λ/4 optical phase plates 3031 and 3032 whose optical axes are almost perpendicular to each other is arranged in a polarization illumination device 10.

The polarization illumination device 10 comprises: a light source unit having a paraboloidal reflecting mirror 2 and a light source 1 including a metal halide lamp, located near a focal position of the paraboloidal reflecting mirror 2, for emitting white light $L_P + L_S$ as indeterminate polarized light having polarized components in random directions; the λ/4 optical phase plate 303; and a polarization beam splitter 5 having a sector-shaped section, having an incident surface 51 opposite to the λ/4 optical phase plate 303, and arranged such that one side of the incident surface 51 is in contact with one side of an exit surface 52 at a right angle.

The polarization beam splitter 5 has an operation surface 54. One side of the operation surface 54 is in contact with one side of the incident surface 51 at an angle of 45° and the other side of the operation surface 54 is in contact with an opposite surface. The operation surface 54 transmits a P-polarized light component $L_P$ of white light $L_P + L_S$ and reflects an S-polarized light component $L_S$. Note that the operation surface 54 is constituted by a deposition film having a sector-shaped section. This deposition film is formed on an inclined surface where two prisms are bonded to each other. The opposite surface of the polarization beam splitter 5 is a reflecting surface 53 having a reflecting film on an arcuated surface having a sector-shaped section. An infrared cut filter 3 is arranged opposite to the λ/4 optical phase plate 4 between the light source unit and the λ/4 optical phase plate 4.

The white light $L_P + L_S$ (indicated by a solid line in FIG. 15) emitted from the light source 1 to the paraboloidal reflecting mirror 2 is reflected and collimated by the paraboloidal reflecting mirror 2 and is incident on the infrared cut filter 3. Infrared rays except for visible light are absorbed by the infrared cut filter 3. The white light $L_P + L_S$ then passes through the λ/4 optical phase plate 4 and is incident on the polarization beam splitter 5. The P-polarized light component $L_P$ is transmitted by the operation surface 54 of the polarization beam splitter 5, and at the same time, the S-polarized light component $L_S$ is reflected to the right at a right angle, thereby obtaining the P- and S-polarized light components $L_P$ and $L_S$.

The P-polarized light component $L_P$ passing through the operation surface 54 is reflected to the left by the reflecting surface 53 of the polarization beam splitter 5 and emerges from the exit surface 52 of the polarization beam splitter 5. In this case, since the reflecting surface 53 has a concave shape, the P-polarized light component $L_P$ is focused and emerges from the exit surface 52.

The S-polarized light component $L_S$ (indicated by a broken line in FIG. 15) reflected by the operation surface 54 is reflected upward by the reflecting surface 53. Since the reflecting surface is a concave surface, the S-polarized light component $L_S$ is reflected so that its optical path is slightly shifted toward the light source 1. The S-polarized light component $L_S$ reflected by the reflecting surface 53 emerges from the incident surface 51 of the polarization beam splitter 5, converted into a circularly polarized light component $L_C$ by the λ/4 optical phase plate 3031, passes through the infrared cut filter 3, and is incident on the paraboloidal reflecting mirror 2. This circularly polarized light component $L_C$ is reflected toward the light source 1 by the paraboloidal reflecting mirror 2. However, since the optical path of the S-polarized light component $L_S$ is shifted toward the light source 1 by the reflecting surface 53, the S-polarized light component $L_S$ returns to the paraboloidal reflecting mirror 2 through an optical path not parallel to the optical path of the white light $L_P + L_S$ from the light source 1. The circularly polarized light component $L_C$ does not impinge on the light source 1 but passes near the light source 1. The circularly polarized light component $L_C$ is then reflected by the paraboloidal reflecting mirror 2 again and is emitted from the light source unit as almost collimated light. The circularly polarized light component $L_c$ emitted from the light source unit passes through the infrared cut filter 3 and the λ/4 optical phase plate 3032 and is incident on the polarization beam splitter 5 again. At this time, the circularly polarized light component $L_C$ is converted into a P-polarized light component $L_{P*}$ since the circularly polarized light component $L_C$ passes through the λ/4 optical phase plate 3032 so that the polarization direction is rotated through 90°. The resultant beam component passes through the operation surface 54 and is reflected to the left by the reflecting surface 53. The reflected component emerges from the exit surface 52. At this time, since the reflecting surface 53 is a concave surface, the converted P-polarized light component $L_{P*}$ is focused by the reflecting surface 53 and emerges from the exit surface 52.

Figure 16:
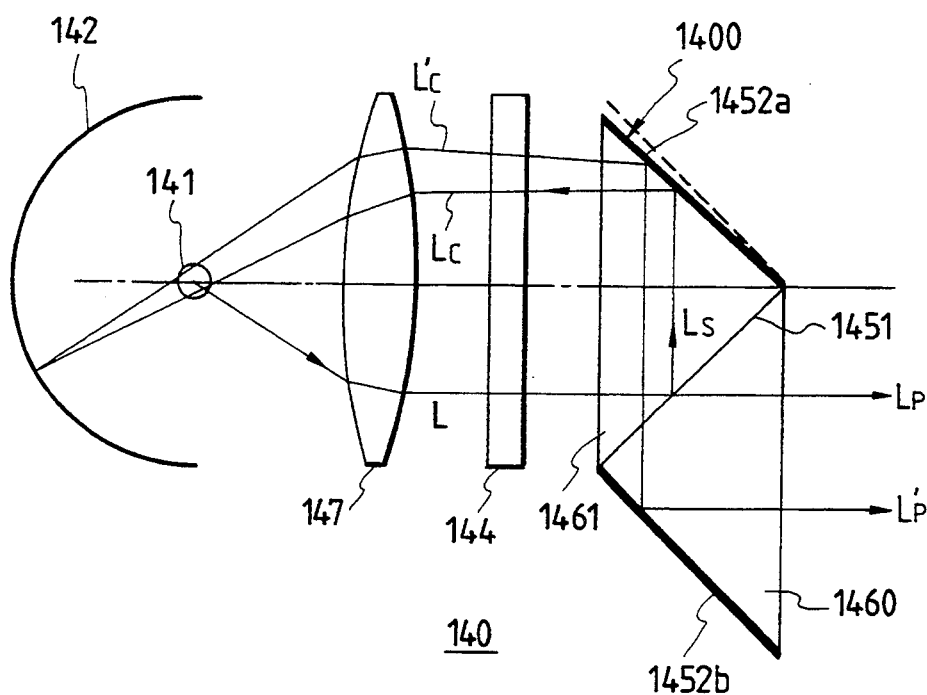
FIG. 16 is a schematic view showing the ninth embodiment of a polarization illumination device according to the present invention.

FIG. 16 shows the main part of the ninth embodiment of a polarization illumination device according to the present invention. This device 140 comprises a light source 141 including a halogen lamp, a metal halide lamp, or the like, a spherical mirror 142 arranged behind the light source 141, a condenser lens 147 for collimating part of a beam emitted from the light source 141, a λ/4 optical phase plate 144 arranged in an optical path of the collimated beam, and a polarizer 1400 for converting the collimated beam consisting of indeterminate polarized light into linearly polarized light.

The polarizer 1400 of this embodiment comprises a rectangular prism 1460 having a sectional shape of a right-angled triangle, an acute-angled prism 1461 (a cross section including a broken line has a shape of a right-angled triangle) having the same shape and the same area as those of the surfaces forming the right angle of the rectangular prism 1460. The rectangular prism 1460 is bonded to the acute-angled prism 1461, and a bonded portion constitutes a polarization splitting film 1451. The polarization splitting film 1451 constituted by a multilayered film may be formed on one or each of the surfaces of the rectangular prism 1460 and the acute-angled prism 1461. Aluminum deposition may be performed on total reflection surfaces 1452a and 1452b, as needed.

The polarization splitting film 1451 has a function for light incident thereon at an angle of about 45°. More specifically, an S-polarized light component having a polarization direction parallel to that of the polarization splitting film 1451 is reflected and a P-polarized light component having a polarization direction perpendicular to that of the S-polarized light component is transmitted. Referring to FIG. 16, collimated light L through the condenser lens 147 passes through the λ/4 optical phase plate 144 as the indeterminate polarized light. A P-polarized light component $L_P$ of the collimated light L is transmitted through the polarization splitting film 1451 and emerges from the rectangular prism 1460. On the other hand, an S-polarized light component $L_S$ reflected by the polarization splitting film 1451 is reflected by the total reflection surface 1452a and emerges from the rectangular prism 1460. Since the polarization splitting film 1451 is not perpendicular to the total reflection surface 1452a, the S-polarized light component $L_S$ is directed to the λ/4 optical phase plate 144 along an optical path not parallel to that of the collimated light L.

The S-polarized light component $L_S$ receives an influence of the λ/4 optical phase plate 144 having an optical axis extending in a predetermined direction and is converted into a circularly polarized light component $L_C$. This light component $L_C$ is directed through the condenser lens 147 toward a position shifted off from a light emitting portion of the light source 141 located at the focal position of the condenser lens 147, which is the position of the center of curvature of a spherical reflecting mirror 142. As described above, since the circularly polarized light component $L_C$ is not parallel to the collimated light L, the circularly polarized light component does not directly impinge on the light source 141 and detours the light-emitting portion of the light source 141. The rotational direction of the circularly polarized light component $L_C$ which is not scattered or absorbed by the light-emitting portion, i.e., which detours the light-emitting portion, is reversed as a circularly polarized light component $L_C'$ when the light component $L_C$ is reflected by the spherical reflecting mirror 142. The circularly polarized light component $L_C'$ passes through a position shifted off from the light-emitting portion of the light source 141 and becomes almost collimated light through the condenser lens 147. When the light component $L_C'$ passes through the λ/4 optical phase plate 144, it is converted into a P-polarized light component $L_P'$, reflected by the reflecting surface 1452a, passes through the polarization splitting film 1451, reflected by the reflecting surface 1452b, and emerges from the rectangular prism 1460.

Since the S-polarized light component $L_S$ passes through the λ/4 optical phase plate 144 twice (i.e., reciprocation), this component receives the same effect as in the case wherein the component passes through a λ/2 optical phase plate once. The polarization direction is rotated through 90°, and the S-polarized light component $L_S$ is converted into a P-polarized light component $L_P'$.

It is essential not to cause at least part of the light reflected by the polarization splitting film 1451 and returned to the light source to pass through the light-emitting portion of the light source. The total reflection surface 1452a may be inclined at 45° from the collimated light L, and the polarization splitting film 1451 may be inclined at an angle except for 45° from the collimated light L. In addition, one or both of the polarization splitting film 1451 and the total reflection surface 1452a may have a curvature to prevent the light returned to the light source 1451 from passing through the light-emitting portion of the light source 141.

It is preferable that the finally obtained P-polarized light components $L_P$ and $L_P'$ are almost parallel to each other.

In a most preferable form, the collimated light L is incident on the polarization splitting film 1451 with the highest polarization splitting effect, and the light returned to the light source 141 does not pass through the light-emitting portion of the light source.

Prevention of direct impingement of the light on the light-emitting portion must be satisfied. At the same time, an angle of incidence of light returned to the light source 141 on the polarization splitting film 1451 must fall within the allowable range of angle capable of causing the polarizing splitting film 1451 to effectively perform polarization and splitting.

As is also apparent from the embodiment of FIG. 16, a high-intensity central light component of the beam emitted from the light source 141 is distributed in the peripheral portion of the polarizer 1400 upon transmission through the polarizer 1400, and a low-intensity peripheral light component of the beam from the light source 141 is distributed at the central portion upon transmission through the polarizer 1400. The emerging beam illuminates an image forming means such as a liquid crystal light bulb. That is, since the central and peripheral light components are reversed, so that the amount of peripheral light can be increased, thus obtaining an additional effect.

Figure 17:
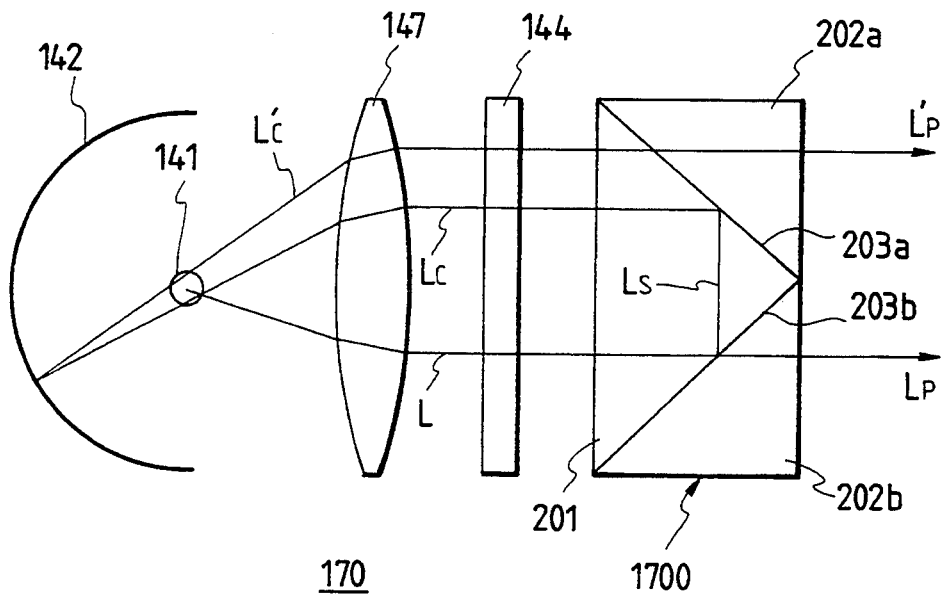
FIG. 17 is a schematic view showing the tenth embodiment of a polarization illumination device according to the present invention.

FIG. 17 shows the main part of the tenth embodiment of a polarization illumination device according to the present invention. This polarization illumination device comprises a light source 141 including a halogen lamp or a metal halide lamp, a spherical mirror 142 located behind the light source 141, a condenser lens 147 for collimating part of the beam emitted from the light source 141, a λ/4 optical phase plate 144 arranged in the optical path of the collimated beam, and a polarizer 1700 for converting the collimated beam into linearly polarized light.

The polarizer 1700 of this embodiment comprises an acute-angled prism 201 having a sectional shape of an acute-angled triangle whose vertex angle is close to a right angle, and two rectangular prisms 202a and 202b. The acute-angled triangle 201 and the rectangular prisms 202a and 202b are bonded to each other, so that the bonded surfaces have polarization splitting films 203a and 203b. The polarization splitting film 203b is inclined at about 45° with respect to the optical axis of the light source 141, and the polarization splitting film 203b is set at an angle slightly larger than 45° with respect to the optical axis of the light source 141.

Referring to FIG. 17, light L collimated through the condenser lens 147 passes through the λ/4 optical phase plate 147 as the indeterminate polarized light. A P-polarized light component $L_P$ of the collimated light L is transmitted through the polarization splitting film 203b and emerges from the rectangular prism 202b. On the other hand, an S-polarized light component reflected by the polarization splitting film 203b is reflected by the polarization splitting film 203a again and emerges from the rectangular prism 201 as an S-polarized light component $L_S$. Since the angle of the polarization splitting film 203a with respect to the optical axis of a polarization illumination device 170 is different from the angle of the polarization splitting film 203b with respect to this optical axis, the S-polarized light component $L_S$ is not parallel to the collimated light L and is directed to the illuminating means.

The S-polarized light component $L_S$ is converted into a circularly polarized light component $L_C$ through the λ/4 optical phase plate 144 having an optical axis extending in a predetermined direction. The circularly polarized light component $L_C$ is directed through the condenser lens 147 toward a position slightly shifted off from the light-emitting portion of the light source 141 located at the focal position of the condenser lens 147 which corresponds to the position of the center of curvature of a spherical reflecting mirror 142. As described above, since the circularly polarized light component $L_C$ is not parallel to the collimated light L and does not directly impinge on the light source 141 and detours the light-emitting portion. The rotational direction of the circularly polarized light component $L_C$ which detours the light-emitting portion, i.e., which is not scattered or absorbed, is reversed when it is reflected by the spherical mirror 142, thereby obtaining a circularly polarized light component $L_C'$. The light component $L_C'$ passes near the light-emitting portion again and is collimated through the condenser lens 147. When this light component passes through the λ/4 optical phase plate 144, it is converted into a P-polarized light component $L_P'$. The P-polarized light component $L_P'$ passes through the polarization splitting film 203a and emerges from the rectangular prism 202a.

Since the S-polarized light component $L_S$ passes through the λ/4 optical phase plate 144 twice (i.e., reciprocation), this component receives the same effect as in the case wherein the component passes through a λ/2 optical phase plate once. The polarization direction is rotated through 90°, and the S-polarized light component $L_S$ is converted into a P-polarized light component $L_P'$.

In each embodiment described above, a paraboloidal reflecting mirror or a spherical reflecting mirror is used as a reflector. However, an elliptical reflecting mirror may be used as the reflector. Although the paraboloidal reflecting mirror generally has higher optical utilization efficiency than that of the spherical reflecting mirror for obtaining a collimated beam, the spherical reflecting mirror can be advantageously utilized to improve polarization conversion efficiency because the number of times of reflection at the reflecting mirror is an odd number.

The present invention is not limited to the above embodiments, but various changes and modifications may be made without departing the spirit and scope of the invention.

For example, a grid polarizer or a cholesteric liquid crystal may be used in place of the polarization splitting film 1451 or 203 used in the embodiment of FIG. 16 or 17.

The grid polarizer has a micro-grid structure in which metal members are arranged parallel to each other. When light having a wavelength twice the grid pitch is to be incident, a polarized light component parallel to the grid is reflected, and a polarized light component perpendicular to the grid is transmitted.

The cholesteric liquid crystal has a function of separating indeterminate polarized light into a pair of circularly polarized light components rotated clockwise and counterclockwise and reflects one circularly polarized light component and transmits the other circularly polarized light component. When light is to be reflected by a reflecting mirror located behind the light source, the clockwise circularly polarized light component becomes a counterclockwise circularly polarized light component, and vice versa. A λ/4 optical phase plate need not be arranged in front of the light source unlike in each embodiment described above. That is, the linearly polarized light need not be converted into circularly polarized light.

In this case, a beam emitted from the polarization illumination device of this embodiment is circularly polarized light. When a liquid crystal light bulb for modulating the linearly polarized light to form image light is used, a λ/4 optical phase plate is placed in the optical path of the exit light to convert the circularly polarized light into linearly polarized light.

In each embodiment described above, a surface, on which a total reflection surface or a polarization splitting film for reflecting light toward the light source, a cholesteric liquid crystal layer, or a grid polarizer is formed, may be a flat or curved surface, as described above. It is essential not to cause at least part of the beam returning toward the light source to impinge on the light-emitting portion. This can apply to all polarization illumination devices for returning polarized light to the light source in addition to the embodiments disclosed in the present application.

At least part of the light returning to the light source does not impinge on at least the light-emitting portion such as a filament to achieve the present invention. A light source such as a halogen lamp, a xenon lamp, or a metal halide lamp causes light scattering or absorption by a glass bulb around the light-emitting portion because various metals are deposited on the inner surface of the glass bulb with a lapse of light emission time and the glass portion of the lamp is degraded and "frosts". More specifically, at least part of the light returning to the light source preferably detours the glass member around the light-emitting portion.

In order to optimize the splitting function of the splitting film of a prism used in each embodiment described above, various types of optical glass materials having different basic optical characteristics and proposing a wide selection of refractive indices are frequently used. However, a plastic material may be used, or parallel plates may be used in place of a prism.

The splitting films 1451 and 203 are generally formed by optical multilayered films. The $\lambda/4$ optical phase plate may be formed by a crystalline material such as mica or quartz, a rolled polymer film, a low molecular liquid crystal having a predetermined thickness and having molecular axes aligned in a predetermined direction, or a side chain type polymer liquid crystal, or a low molecular liquid crystal dispersed in a polymer.

FIGS. 18A and 18B are views showing the twelfth embodiment of a polarization illumination device according to the present invention.

A polarization illumination device 180 of this embodiment comprises a light source 1811, a reflector 1812 for collimating indeterminate polarized light emitted from the light source 1811, an infrared cut filter 1813 for absorbing infrared rays of the light emitted from the light source 1811, a $\lambda/4$ optical phase plate 1814, a polarization beam splitter 1815, and a non-plane reflecting mirror 1816 (to be described in detail later).

In the illumination device 180 of this embodiment, light emitted from the light source 1811 is reflected by the reflector 1812, passes through the infrared cut filter 1813 and the $\lambda/4$ optical phase plate 1814, and is incident on the polarization beam splitter 1815. The light incident on the polarization beam splitter 1815 is split into P-polarized light components $P_1$, $P_2$, and $P_3$, and S-polarized light components $S_1$, $S_2$, and $S_3$ by a polarization film. The P-polarized light components $P_1$, $P_2$, and $P_3$ are directly transmitted and emerge as illumination light for a liquid crystal device (not shown). However, the S-polarized light components $S_1$, $S_2$, and $S_3$ are reflected toward the non-plane reflecting mirror 1816 by the polarization film. The reflected S-polarized light components $S_1$, $S_2$, and $S_3$ are reflected by the non-plane reflecting mirror 1816 and are incident on the polarization beam splitter 1815 again.

The non-plane reflecting mirror 1816 has a reflecting surface as a double convex mirror constituted by two convex surfaces having different curvatures with respect to incident light. The optical path of light reflected by this reflecting surface is slightly shifted from that of the incident light.

The S-polarized light components $S_1$, $S_2$, and $S_3$ split by the polarization beam splitter 1815 and incident on the non-plane reflecting mirror 1816 are reflected by the non-plane reflecting mirror 1816 and are incident on the polarization beam splitter 1815 again through reflection optical paths different from the incident optical paths.

The S-polarized light components $S_1$, $S_2$, and $S_3$ incident on the polarization beam splitter 1815 again are further reflected by the polarization film surface of the polarization beam splitter 1815, pass through the $\lambda/4$ optical phase plate 1814 and the infrared cut filter 1813 in the order named, and are directed toward the reflector 1812. At this time, since the S-polarized light components $S_1$, $S_2$, and $S_3$ have been reflected by the non-plane reflecting mirror 1816, they reach the reflector 1812 through optical paths different from the incident optical paths. The S-polarized light components $S_1$, $S_2$, and $S_3$ reaching the reflector 1812 are reflected by the reflector 1812, detour the light-emitting portion of the light source 1811, impinge on the reflector 1812 again, and are reflected toward the infrared cut filter 1813. The S-polarized light components $S_1$, $S_2$, and $S_3$ pass through the infrared cut filter 1813 and are incident on the $\lambda/4$ optical phase plate 1814. At this time, the S-polarized light components $S_1$, $S_2$, and $S_3$ are polarized and split by the polarization beam splitter 1015 and are incident on the $\lambda/4$ optical phase plate 1814 for the second time, so that the S-polarized light components $S_1$, $S_2$, and $S_3$ are reflected by the curved surfaces of the reflectors 1812 and 1816, the directions of parts of the S-polarized light components $S_1$, $S_2$, and $S_3$ are rotated through $\pi/2$. Therefore, the S-polarized light components $S_1$, $S_2$, and $S_3$ are converted into P-polarized light components $P_1'$, $P_2'$, and $P_3'$, respectively.

These P-polarized light components $P_1'$, $P_2'$, and $P_3'$ are sequentially incident on the polarization beam splitter 1815 and are transmitted therethrough together with the P-polarized light components $P_1$, $P_2$, and $P_3$.

The P- and S-polarized light components polarized and split by the polarization beam splitter 1815 are converted into P-polarized light components and synthesized and emerge through the polarization beam splitter 1815, the $\lambda/4$ optical phase plate 1814, the non-plane reflecting mirror 1816, the reflector 1812, and the like.

In the polarization illumination device 180 of this embodiment, light containing both the P- and S-polarized light components and emitted from the light source 1811 is output as almost collimated light. At the same time, the S-polarized light components reflected by the polarization beam splitter 1815 are reflected by the non-plane reflecting mirror 1816 so that they do not pass through the light source 1811, thereby preventing light scattering and attenuation in the light source 1811.

The non-plane reflecting mirror 1816 will be described in detail with reference to FIG. 18B.

As described above, in order to prevent reflected light from passing through the light source 1811, the non-plane reflecting mirror 1816 has a convex mirror formed on the reflecting surface 1816 for the incident light. In this embodiment, the reflecting surface has a double convex mirror having central and peripheral convex surfaces having different curvatures.

The shape of the reflecting surface 1816 is determined as follows. The curvatures of the convex surfaces are determined in consideration of the size of the light source 1811 so that the reflected light components are incident on the polarization beam splitter 1815 along optical paths different from those of the incident S-polarized light components $S_1$, $S_2$, and $S_3$ and are reflected, and the reflected light components do not pass through the light source 1811. In particular, the central portion of the reflecting surface 1816 preferably has a curvature determined so that a reflected light component of the S-polarized light component $S_1$ emerging from the central portion of the light source 1811 passes along an almost tangent of the light source 1811. Note that the size of the general light-emitting portion of the light source 1811 is preferably about 5 mm in diameter for a metal halide lamp. The shape of the reflecting surface must also be determined so that light emitted from the peripheral portion of the light source 1811 does not pass through the light source 1811 but detour it.

The fourth embodiment of a projection display apparatus serving as a liquid crystal projection television using the above polarization illumination device 180 will be described with reference to FIG. 19.

The liquid crystal projection television comprises: the polarization illumination device 180; a condenser lens 1817 for focusing illumination light emitted from the polarization illumination device 180; a blue reflection dichroic mirror 1818 and a green reflection dichroic mirror 1819 for separating the illumination light focused by the condenser lens 1817 into red, green, and blue light components; a red liquid crystal panel 1820$_R$, a green liquid crystal panel 1820$_G$, and a blue liquid crystal panel 1820$_B$ for respectively forming red, green, and blue images; two reflecting mirrors 1821 and 1822; a green reflection dichroic mirror 1823 for synthesizing the red, green, and blue image light components; a polarization beam splitter 1824; a $\lambda/2$ optical phase plate 1826; and a projection lens 1827 for enlarging and projecting onto a screen 1828 a composite image of the respective color images which is synthesized by the polarization beam splitter 1824. In addition, a light-absorbing plate 15 for absorbing unnecessary light components of the respective color image light components is mounted on the polarization beam splitter 1824.

The red liquid crystal panel 1820$_R$, the green liquid crystal panel 1820$_G$, and blue liquid crystal panel 1820$_B$ are transmission TN liquid crystal devices and have characteristics for modulating the planes of the incident light every pixel upon application of voltages corresponding to the respective color component image signals.

Figure 19:
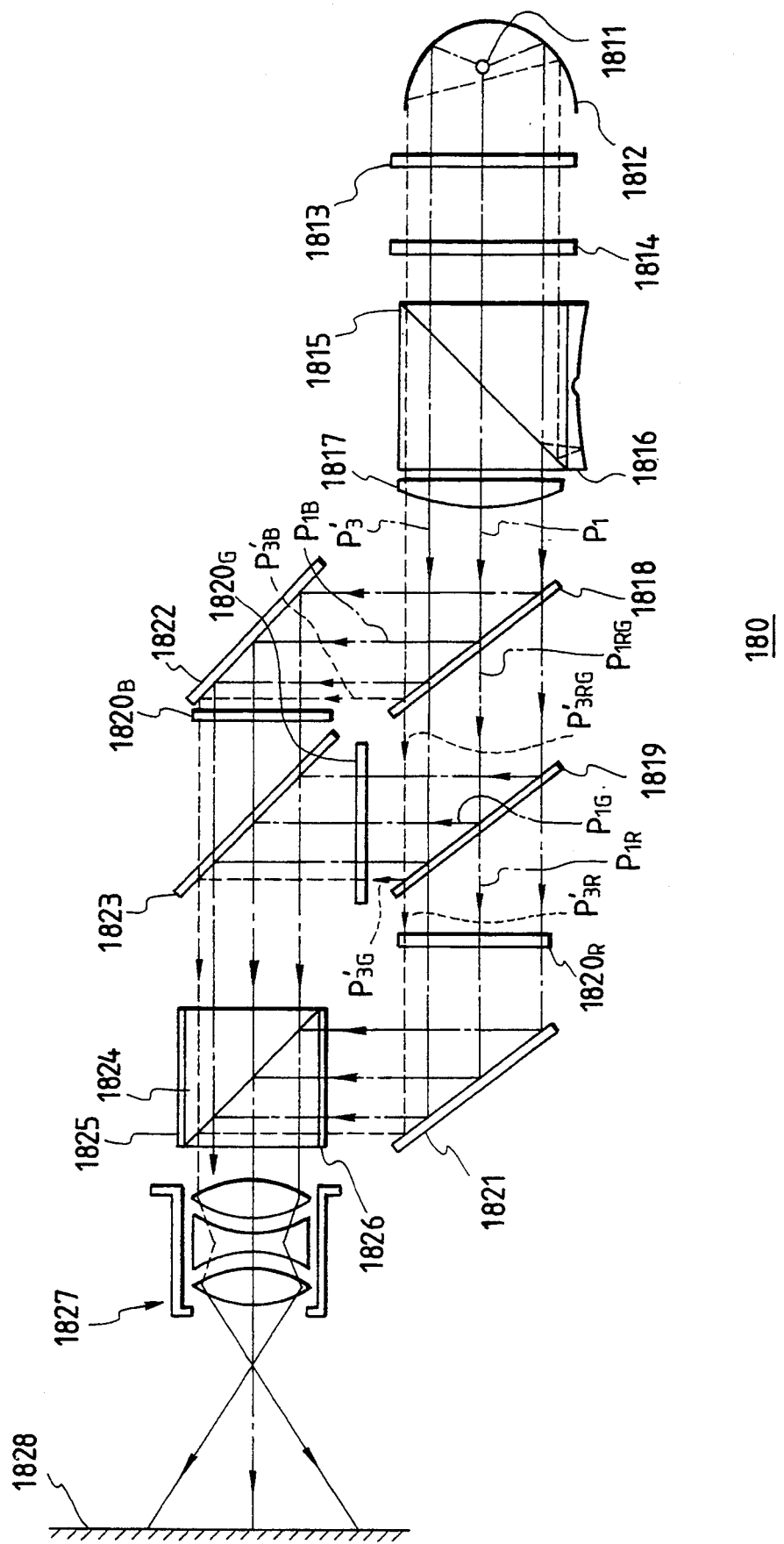
FIG. 19 is a schematic view showing the fourth embodiment of a projection display apparatus according to the present invention.

Note that a beam emitted from the polarization illumination device 180 in FIG. 19 contains only P-polarized light components $P_1$ and $P_3$ (FIG. 18A) for illustrative convenience.

The P-polarized illumination light ($P_1 + P_3'$) emitted from the polarization illumination device 180 is slightly focused by the condenser lens 1817 and is incident on the blue reflection dichroic mirror 1818.

This blue reflection dichroic mirror 1818 reflects the blue component ($P_{1B} + P_{3B}'$) of the illumination light toward the reflecting mirror 1822 and transmits other components, i.e., the red and green components ($P_{1RG} + P_{3RG}'$).

The blue component ($P_{1B} + P_{3B}'$) is then reflected by the reflecting mirror 1822 and is incident on the blue liquid crystal panel 1820$_B$. The blue component ($P_{1B} + P_{3B}'$) incident on the blue liquid crystal panel 1820$_B$ is modulated in units of pixels and is output as blue image light containing P- and S-polarized components in accordance with the degree of modulation. This blue image light is then incident on the green reflection dichroic mirror 1823.

On the other hand, the red and green components ($P_{1RG} + P_{3RG}'$) passing through the blue reflection dichroic mirror 1818 are incident on the green reflection dichroic mirror 1819 and are separated into the green component ($P_{1G} + P_{3G}'$) which will be transmitted through the green reflection dichroic mirror 1819 and the red component ($P_{1R} + P_{3R}'$) which will be transmitted through the green reflection dichroic mirror 1819. The reflected green component ($P_{1G} + P_{3G}'$) is incident on the green liquid crystal panel 1820$_G$ and is converted into green image light containing the P- and S-polarized components as in the blue component ($P_{1B} + P_{3B}'$). The green image light is incident on the green reflection dichroic mirror 1823 and is synthesized with the blue image light.

Synthesis of the blue image light and the green image light is performed by transmitting the blue image light and reflecting the green image light in the green reflection dichroic mirror 1823. The composite light of the green image light and the blue image light is incident on the polarization beam splitter 1824.

The red light component ($P_{1R} + P_{3R}'$) is transmitted through the green reflection dichroic mirror 1819 and is incident on the red liquid crystal panel 1820$_R$. Red image light containing P- and S-polarized light components emerges as in the blue light component ($P_{1B} + P_{3B}'$). The red image light emerging from the red liquid crystal panel 1820$_R$ is reflected by the reflecting mirror 1821, passes through the $\lambda/2$ optical phase plate 1826, and is incident on the polarization beam splitter 1824. At this time, the red image light has passed through the $\lambda/2$ optical phase plate 1826, the directions of the P- and S-polarized light components are rotated through $\pi/2$ and are converted into S- and P-polarized light components, respectively. When the red image light is incident on the polarization beam splitter 1824, the P-polarized light component passes as unnecessary light and is absorbed by the light-absorbing plate 1825. The S-polarized light component is reflected and is incident on the projection lens 1827.

When the composite image light of the green image light and the blue image light, which is synthesized by the green reflection dichroic mirror 1823 is incident on the polarization beam splitter 1824, the S-polarized light component is reflected and absorbed by the light-absorbing plate 1825 as unnecessary light. The P-polarized light component is transmitted and incident on the projection lens 1827. At this time, the P-polarized light component of the composite image light of the green image light and the blue image light is synthesized with the S-polarized light component of the red image light, so that a composite light image of the respective colors, i.e., red, green, and blue is enlarged and projected on the screen 1828 through the projection lens 1827.

Figure 20:
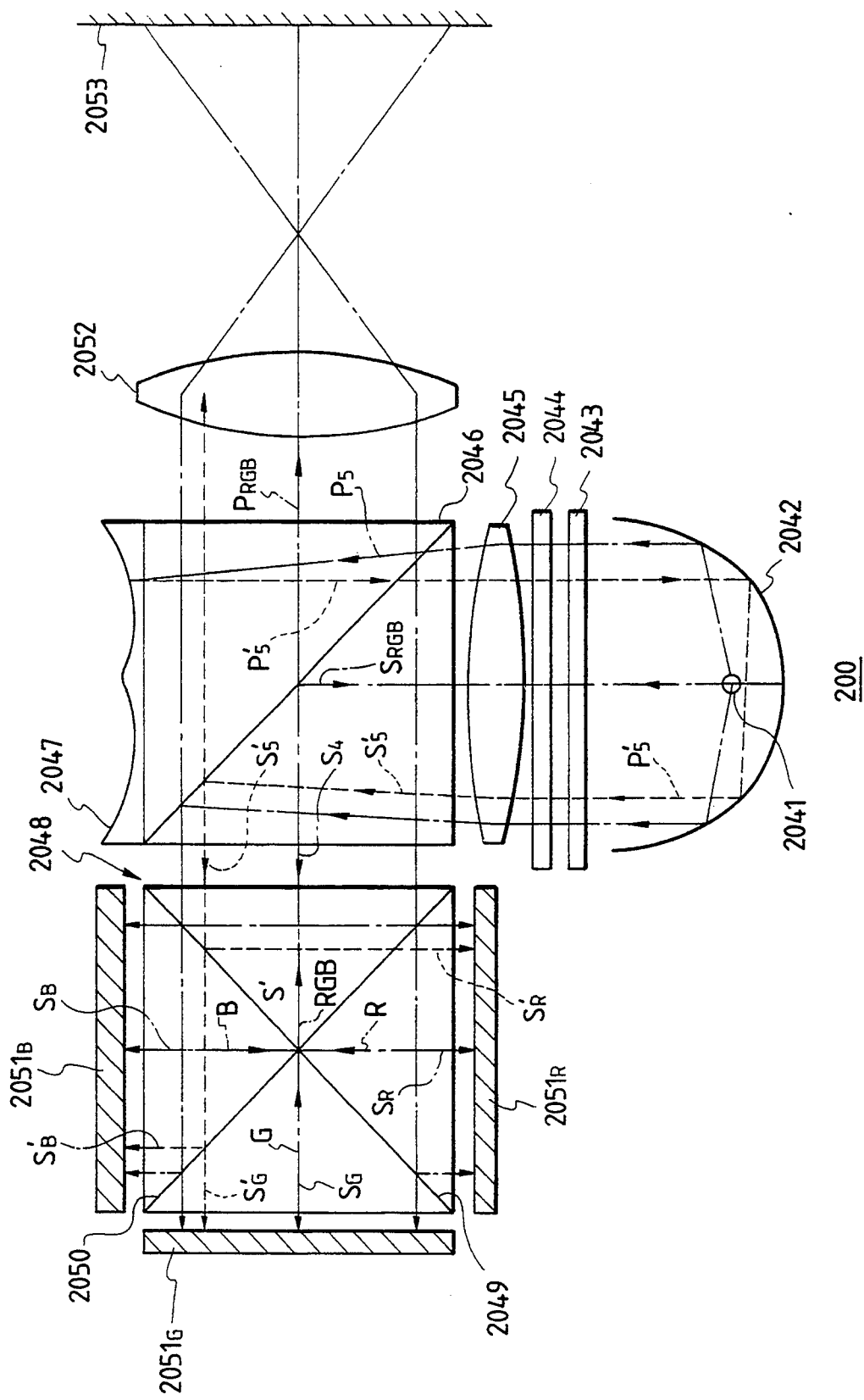
FIG. 20 is a schematic view showing the fifth embodiment of a projection display apparatus according to the present invention.

FIG. 20 is a view showing the fifth embodiment of a projection display apparatus according to the present invention.

A polarization illumination device 200 of this embodiment emits illumination light containing S-polarized light components as opposed to the polarization illumination device 180 for emitting illumination light containing P-polarized light components.

A non-plane reflecting mirror 2047 of the polarization illumination device of this embodiment is a convex mirror having a recessed central portion formed on the reflecting surface.

Indeterminate polarized light emitted from a light source 2041 is reflected by a reflector 2042 and collimated, passes through an infrared cut filter 2043, a λ/4 optical phase plate 2044, and a condenser lens 2045, and is incident on a polarization beam splitter 2046.

Light incident on the polarization beam splitter 2046 is separated into a P-polarized light component (e.g., $P_5$) transmitted through the polarization film of the polarization beam splitter 2046 and an S-polarized light component (e.g., $S_4$) reflected by the polarization film of the polarization beam splitter 2046. The separated P-polarized light component $P_5$ is transmitted through the polarization beam splitter 2046, and incident on and reflected by a non-plane reflecting mirror 2047. A reflected light component $P_5'$ is incident on the polarization beam splitter 2046 and is transmitted through its polarization film. The reflected light component $P_5'$ transmitted through the polarization beam splitter 2046 passes through the condenser lens 2045, the λ/4 optical phase plate 2044, and the infrared cut filter 2043 in the order named, and returns to the light source 2041. The reflected light component $P_5'$ passing through the infrared cut filter 2043 is further reflected by the reflector 2042, passes through the λ/4 optical phase plate 2044 and the condenser lens 2045 in the order named, and is incident on the polarization beam splitter 2046.

At this time, after the reflected light component $P_5'$ split by the polarization beam splitter 2046, it has passed through the λ/4 optical phase plate 2044 twice and has been reflected by the reflectors 2042 and 2047, so that it has been partially converted into an S-polarized light component. The converted portion is incident on the polarization beam splitter 2046 again as an S-polarized light component $S_5'$. In the polarization beam splitter 2046, since the S-polarized light component is reflected, the S-polarized light component $S_5'$ is reflected together with the S-polarized light component $S_4$, and the composite light emerges from the polarization beam splitter 2046 as illumination light $(S_4+S_5')$ and is incident on a cross dichroic prism 2048 located in front of the exit light.

The cross dichroic prism 2048 has a red reflection dichroic film 2049 and a blue reflection dichroic film 2050 on its diagonal line. In addition, red, green, and blue reflection liquid crystal panels $2051_R$, $2051_G$, and $2051_B$ are formed on three side surfaces except for the incident surface of the cross dichroic prism 2048 for the illumination light $(S_4+S_5')$ in correspondence with the reflection and transmission directions of the red, green, and blue light components from the red and blue reflection dichroic films 2049 and 2050.

The red, green, and blue reflection liquid crystal panels $2051_R$, $2051_G$, and $2051_B$ are ECB (Electrically Controlled Birefringence) reflection liquid crystal devices and modulate the incident light every pixel upon application of voltages corresponding to the corresponding color component image signals. Exit light components from the respective reflection liquid crystal panels $2051_R$, $2051_G$, and $2051_B$ are composite light beams each containing S- and P-polarized light components.

When the illumination light $(S_4+S_5')$ is incident on the cross dichroic prism 2048, it is split into a red light component $(S_R+S_R')$, a green light component $(S_G+S_G')$, and a blue light component $(S_B+S_B')$. These light components are incident on the red reflection liquid crystal panel $2051_R$, the green reflection liquid crystal panel $2051_G$, and the blue reflection liquid crystal panel $2051_B$, respectively. The red, green, and blue light components are modulated by the corresponding reflection liquid panels $2051_R$, $2051_G$, and $2051_B$, and are output as red image light R, green image light G, and blue image light B each containing S- and P-polarized light components. The red image light R, the green image light G, and the blue image light B are synthesized by the cross dichroic prism 2048, and composite light RGB is incident on the polarization beam splitter 2046. When the composite image light RGB is incident on the polarization beam splitter 2046, the S-polarized light component is reflected toward the light source 2041 as an unnecessary component. A P-polarized light component $R_{RGB}$ transmitted through the polarization beam splitter 2046 is enlarged and projected on a screen 2053 through a projection lens 2052 as projected image light.

In this embodiment, the polarization beam splitter 2046 serves as a polarizer and an analyzer for the reflection liquid crystal panels $2051_R$, $2051_G$, and $2051_B$.

In each embodiment described above, the reflecting means has a non-plane reflecting surface. However, the present invention is not limited to this. A reflecting surface of the reflecting means is inclined at a predetermined inclination angle to obtain the same effect as described above.

When the reflecting surface comprises an inclined surface reflecting means used in the polarization illumination device 180 shown in FIG. 18A, the S-polarized light components $S_1$, $S_2$, and $S_3$ reflected by the reflecting means are incident again on the polarization beam splitter 1815 along optical paths different from the incident optical paths of the reflecting means. These light components are reflected by the reflector 1812 without passing through the light source 1811 along optical paths different from the exit optical paths from the light source 1811. The light components then pass through the infrared cut filter 1813 and the λ/4 optical phase plate 1815 and are converted into P-polarized light components $P_1'$, $P_2'$, and $P_3'$. The P-polarized light components $P_1'$, $P_2'$, and $P_3'$ are incident on the polarization beam splitter 1815 again and emerge together with the P-polarized light components $P_1$, $P_2$, and $P_3$, thereby obtaining illumination light. A liquid crystal device is illuminated with a liquid crystal device (not shown).

The apparatuses shown in FIGS. 19 and 20 have the following effects.

Since the polarization beam splitter performs polarization, splitting, and synthesis and serves as a polarizer and an analyzer for the liquid crystal device such as a liquid crystal projection television, adjustment of the optical utilization efficiency and adjustment of high contrast can be eliminated, and the unitization efficiency of the light source light can be improved with a simple structure, thereby providing a highly efficient polarization illumination device.

In particular, even if various metal wastes are deposited inside the light-emitting body and the glass portion of the light-emitting body is degraded and "frosts" in relation to the service life of the light source, the reflected light does not pass through the light-emitting body, and the polarization illumination device can be operated with high efficiency.

Since neither the polarizer nor the analyzer are arranged in the liquid crystal device, temperature rise rarely occurs to realize a high-brightness liquid crystal projection television.

What is claimed is:

1. A method of splitting a substantially collimated radiation beam from a radiation source into first and second polarized beams having different polarization planes by a polarization splitting surface, directing the first beam in a predetermined direction, causing a returning member to return the second beam to said radiation source, reflecting the second beam toward said polarization splitting surface by a reflector located behind said radiation source, and converting the second beam so as to have the same polarization plane as said first polarized beam, wherein said returning member is a reflecting surface oriented so as to return the second beam to said radiation source along an optical path different than that of said substantially collimated radiation beam, where said different optical path passes near but does not substantially impinge on said radiation source.

2. A method according to claim 1, wherein said, reflecting surface is inclined with respect to said substantially collimated radiation beam.

3. A method according to claim 2, wherein said reflecting surface has an optical power.

4. A method of splitting a substantially collimated radiation beam from a radiation source into first and second polarized beams having different polarization planes by a polarization splitting surface, directing the first beam in a predetermined direction, causing a returning member to return the second beam to said radiation source, reflecting the second beam toward said polarization splitting surface by a reflector located behind said radiation source, converting the second beam so as to have the same polarization plane as said first polarized beam, and modulating said polarized beams to form an image, wherein said returning member is a reflecting surface oriented so as to return the second beam to said radiation source along an optical path different than that of said substantially collimated radiation beam, where said different optical path passes near but does not substantially impinge on said radiation source.

5. A method according to claim 4, wherein said, reflecting surface is inclined with respect to said substantially collimated radiation beam.

6. A method according to claim 5, wherein said reflecting surface has an optical power.

7. A method of splitting a radiation beam from a radiation source into first and second polarized beams having different polarization planes by a polarization splitting surface, directing the first beam in a predetermined direction, causing a reflecting surface to return the second beam to said radiation source, coinciding the plane of at least part of the second beam with that of the first beam, reflecting the second beam toward said polarization splitting surface by a reflector located behind said radiation source, and converting the second beam so as to have the same polarization plane as said first polarized beam, comprising setting said reflecting surface and said polarization splitting surface in an inverted V shape in a path of the radiation beam so that said reflecting surface receives part of the radiation beam and said polarization splitting surface receives a remaining part of the radiation beam to split the remaining part into the first polarized beam and the second polarized beam, thereby causing said reflecting surface to reflect said part of the radiation beam toward said polarization splitting surface.

8. A method according to claim 7, wherein said reflecting surface has an optical power.

9. A method of splitting a radiation beam from a radiation source into first and second polarized beams having different polarization planes by a polarization splitting surface, directing the first beam in a predetermined direction, causing a reflecting surface to return the second beam to said radiation source, coinciding the plane of at least part of the second beam with that of the first beam, reflecting the second beam toward said polarization splitting surface by a reflector located behind said radiation source, converting the second beam so as to have the same polarization plane as said first polarized beam, and modulating said polarized beams to form an image, comprising setting said reflecting surface and said polarization splitting surface in an inverted V shape in a path of the radiation beam so that said reflecting surface receives part of the radiation beam and said polarization splitting surface receives a remaining part of the radiation beam to split the remaining part into the first polarized beam and the second polarized beam, thereby causing said reflecting surface to reflect said part of the radiation beam toward said polarization splitting surface.

10. A method according to claim 9, wherein said reflecting surface has an optical power.

11. A polarization illumination device comprising:
illuminating means including a light source and a reflecting mirror located behind said light source; and
polarizing means illuminated with light from said illuminating means and including a polarization splitting surface and a reflecting surface respectively inclined with respect to an optical path of the light from said illuminating means, said reflecting surface having one end in contact with one end of said polarization splitting surface so that said polarization splitting surface and said reflecting surface form an inverted V shape, said polarization splitting surface splitting part of the light from said illuminating means into a transmitted light component and a reflected light component and directing the transmitted light component in a first direction and the reflected light component toward said reflecting surface, said reflecting surface reflecting a remaining part of the light from said illuminating means and directing the reflected remaining part toward said polarization splitting surface, said reflecting surface returning the reflected light component toward said illuminating means, said polarization splitting surface splitting said remaining part of the light emitted from said illuminating means and reflected by said reflecting means into a transmitted light component of said remaining part and a reflected light component of said remaining part, said transmitted light component of said remaining part being directed toward a second direction different from the first direction, and the reflected light component of said remaining part being returned to said illuminating means,
wherein said illuminating means modulates a plane of each returned reflected light component and causes each returned reflected light component to be incident on said polarizing means again.

12. A polarization illumination device comprising:

illuminating means including a light source and a reflecting mirror located behind said light source; and polarizing means illuminated with light from said illuminating means and having a plurality of units arranged in a first direction perpendicular to an optical path of the light from said illuminating means, each unit including a polarization splitting portion and a reflecting portion respectively inclined with respect to an optical path of the light from said illuminating means, said reflecting portion having upper and lower reflecting surfaces, said reflecting portion having one end in contact with one end of said polarization splitting portion so that said polarization splitting portion and said reflecting portion form an inverted V shape, said polarization splitting portion of said unit splitting part of the light from said illuminating means into a transmitted light component and a reflected light component and directing the transmitted light component in a second direction different form the first direction and the reflected light component toward said upper reflecting surface of said reflecting portion, said upper reflecting surface of said reflecting portion reflecting a remaining part of the light from said illuminating means and directing the reflected remaining part toward said polarization splitting portion, said upper reflecting surface of said reflecting portion returning the reflected light component toward said illuminating means, said polarization splitting portion splitting said remaining part of the light emitted from said illuminating means and reflected by said upper reflecting surface of said reflecting means into a transmitted light component of said remaining part and a reflected light component of said remaining part, the transmitted light component of said remaining part being directed toward the first direction and being reflected by said lower reflecting surface of said reflecting portion of an adjacent unit, and the reflected light component of said remaining part being returned to said illuminating means, wherein said illuminating means modulates a plane of each returned reflected light component from each unit and causes each returned reflected light component to be incident on said polarizing means again.

13. A projector comprising:

illuminating means including a light source and a reflecting mirror located behind said light source;

polarizing means illuminated with light from said illuminating means and including a polarization splitting surface and a reflecting surface respectively inclined with respect to an optical path of the light from said illuminating means, said reflecting surface having one end in contact with one end of said polarization splitting surface so that said polarization splitting surface and said reflecting surface form an inverted V shape, said polarization splitting surface splitting part of the light from said illuminating means into a transmitted light component and a reflected light component and directing the transmitted light component in a first direction and the reflected light component toward said reflecting surface, said reflecting surface reflecting a remaining part of the light from said illuminating means and directing the reflected remaining part toward said polarization splitting surface, said reflecting surface returning the reflected light component toward said illuminating means, said polarization splitting surface splitting said remaining part of the light emitted from said illuminating means and reflected by said reflecting means into a transmitted light component of said remaining part and a reflected light component of said remaining part, said transmitted light component of said remaining part being directed toward a second direction different from the first direction, the reflected light component of said remaining part being returned to said illuminating means, and said polarizing means having a polarizing portion for directing, in substantially the same direction, the respective transmitted light components directed in the first and second directions, wherein said illuminating means modulates a plane of each returned reflected light component and causes each returned reflected light component to be incident on said polarizing means again;

means for modulating the polarization planes of the transmitted light components from said polarizing means to generate an image; and means for projecting the image.

14. A projector comprising:

illuminating means including a light source and a reflecting mirror located behind said light source;

polarizing means illuminated with light from said illuminating means and having a plurality of units arranged in a first direction perpendicular to an optical path of the light from said illuminating means, each unit including a polarization splitting portion and a reflecting portion respectively inclined with respect to an optical path of the light from said illuminating means, said reflecting portion having upper and lower reflecting surfaces, said reflecting portion having one end in contact with one end of said polarization splitting portion so that said polarization splitting portion and said reflecting portion form an inverted V shape, said polarization splitting portion of said unit splitting part of the light from said illuminating means into a transmitted light component and a reflected light component and directing the transmitted light component in a second direction different from the first direction and the reflected light component toward said upper reflecting surface of said reflecting portion, said upper reflecting surface of said reflecting portion reflecting a remaining part of the light from said illuminating means and directing the reflected remaining part toward said polarization splitting portion, said upper reflecting surface of said reflecting portion returning the reflected light component toward said illuminating means, said polarization splitting portion splitting said remaining part of the light emitted from said illuminating means and reflected by said upper reflecting surface of said reflecting means into a transmitted light component of said remaining part and a reflected light component of said remaining part, the transmitted light component of said remaining part directed toward the first direction being reflected in the second direction by said lower reflecting surface of said reflecting portion of an adjacent unit, and the reflected light component of said remaining part being returned to said illuminating means, wherein said illuminating means modulates a plane of each returned reflected light component from each unit and causes each returned reflected light component to be incident on said polarizing means again.

means for modulating the polarization planes of the transmitted light components from said polarizing means to generate an image; and means for projecting the image.

15. A polarization illumination device comprising:

illuminating means including a light source and a reflecting mirror located behind said light source;

polarizing means illuminated with substantially collimated light from said illuminating means and including polarization splitting means for splitting the light from said illuminating means into a transmitted light component and a reflected light component, and returning means for returning one of the light components to said illuminating means;

wherein said polarization splitting means is re-illuminated by said returned light component by way of said reflecting mirror; and wherein said returning means is a reflecting surface oriented so as to return said one of the light components to said light source along an optical path different than that of said substantially collimated light, where said different optical path passes near but does not substantially impinge on said light source.

16. A projector comprising:

illuminating means including a light source and a reflecting mirror located behind said light source;

polarizing means, illuminated with substantially collimated light from said illuminating means, for supplying polarized light, said polarizing means including polarization splitting means for splitting the light from said illuminating means into a transmitted light component and a reflected light component, and returning means for returning one of the light components to said illuminating means;

wherein said polarization splitting means is re-illuminated by said returned light component by way of said reflecting mirror;

Wherein said returning means is a reflecting surface oriented so as to return said one of the light components to said light source along an optical path different than that of said substantially collimated light, where said different optical path passes near but does not substantially impinge on said light source;

means for modulating the polarization plane of the polarized light from said polarizing means to generate an image; and means for projecting the image.

* * * * *

UNITED STATES PATENT AND TRADEMARK OFFICE
CERTIFICATE OF CORRECTION

PATENT NO. : 5,387,953
DATED : February 7, 1995
INVENTOR(S) : Nobuo Minoura and Kazumi Kimura It is certified that error appears in the above-identified patent and that said Letters Patent is hereby corrected as shown below:

Column 2, line 22 delete "have"

Column 15, line 38 "PR Of" should read --$P_R$ of--

Column 17, line 42 delete "since"

Signed and Sealed this

Twenty-first Day of November, 1995

Attest:

BRUCE LEHMAN

Attesting Officer

Commissioner of Patents and Trademarks